(12) United States Patent
Somani et al.

(10) Patent No.: US 10,009,745 B2
(45) Date of Patent: Jun. 26, 2018

(54) VALIDATION IN SECURE SHORT-DISTANCE-BASED COMMUNICATION AND ENFORCEMENT SYSTEM ACCORDING TO VISUAL OBJECTS

(71) Applicant: Accenture Global Services Limited, Dublin (IE)

(72) Inventors: Avishek Somani, Toronto (CA); Sunil Raina, Issaquah, WA (US); Scott Thomas Butler, Oakville (CA)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 261 days.

(21) Appl. No.: 14/743,703

(22) Filed: Jun. 18, 2015

(65) Prior Publication Data

US 2016/0055693 A1    Feb. 25, 2016

Related U.S. Application Data

(63) Continuation-in-part of application No. 14/468,202, filed on Aug. 25, 2014.

(51) Int. Cl.
*H04W 4/80* (2018.01)
*H04W 4/00* (2018.01)
(Continued)

(52) U.S. Cl.
CPC ............ *H04W 4/80* (2018.02); *G07B 15/02* (2013.01); *G07C 9/00111* (2013.01); *H04W 4/008* (2013.01)

(58) Field of Classification Search
CPC .......... G07C 2009/00325; G07C 2009/00333; G07C 2009/00341; G07C 2009/00007;
(Continued)

(56) References Cited

U.S. PATENT DOCUMENTS 5,485,347 A    1/1996  Miura
6,885,877 B1   4/2005  Ozaki et al.
(Continued)

FOREIGN PATENT DOCUMENTS

CN    103686613    3/2014
CN    103826205    5/2014
(Continued)

OTHER PUBLICATIONS

"The extended European search report" on EP patent application No. 15196185.1, European Patent Office, dated Feb. 22, 2016, 7 pages.
(Continued)

*Primary Examiner* — Omar Casillashernandez
(74) *Attorney, Agent, or Firm* — Mannava & Kang, P.C.

(57) ABSTRACT

A secure short-distance-based communication and enforcement system validates users in a validation and enforcement area and can check if users in the validation and enforcement area have been validated. A visual object can be displayed on an enforcement computer and a mobile device of a user in the in the validation and enforcement area to determine if a user is validated. The visual object may be periodically changed.

17 Claims, 12 Drawing Sheets

(51) Int. Cl.
*G07B 15/02* (2011.01)
*G07C 9/00* (2006.01)

(58) Field of Classification Search
CPC .......... G07C 2009/00349; G07C 2009/00357; G07C 2009/00365; G07C 2009/0038; G07C 2009/00555; G07C 2009/00579; G07C 2009/00587; G07C 2009/00595; G07C 2009/00603; G07C 9/00182; G07C 9/00111; G07C 9/00309; G07C 9/00571
USPC .................................................. 340/5.6, 5.61
See application file for complete search history.

(56) References Cited

U.S. PATENT DOCUMENTS

| | | | |
|---|---|---|---|
| 7,255,264 | B2 | 8/2007 | De Leon |
| 7,567,920 | B2 | 7/2009 | Hammad et al. |
| 7,731,086 | B2 * | 6/2010 | Saunders ............... G06Q 20/10 235/380 |
| 8,326,221 | B2 | 12/2012 | Dorsey |
| 8,369,842 | B2 | 2/2013 | Proctor, Jr. |
| 8,781,502 | B1 | 7/2014 | Middleton et al. |
| 8,856,916 | B1 | 10/2014 | Sobel |
| 9,204,257 | B1 | 12/2015 | Mendelson |
| 9,317,976 | B2 * | 4/2016 | Andrews ............... G07B 15/00 |
| 9,792,604 | B2 | 10/2017 | Gray et al. |
| 2001/0045886 | A1 | 11/2001 | Minowa |
| 2005/0070257 | A1 | 3/2005 | Saarinen et al. |
| 2005/0093697 | A1 | 5/2005 | Nichani |
| 2005/0233789 | A1 | 10/2005 | Maekawa |
| 2006/0214815 | A1 | 9/2006 | Komatsu |
| 2006/0242908 | A1 | 11/2006 | McKinney |
| 2007/0276765 | A1 | 5/2007 | Hazel |
| 2010/0066503 | A1 | 3/2010 | Rhie et al. |
| 2011/0137773 | A1 * | 6/2011 | Davis, III ............... G06Q 30/04 705/34 |
| 2011/0153495 | A1 * | 6/2011 | Dixon .................. G06Q 20/10 705/39 |
| 2012/0005041 | A1 * | 1/2012 | Mehta ................ G06Q 30/0601 705/27.1 |
| 2012/0235812 | A1 | 9/2012 | Maia et al. |
| 2012/0254040 | A1 | 10/2012 | Dixon et al. |
| 2012/0296828 | A1 * | 11/2012 | Bergdale ............ G06Q 20/0457 705/65 |
| 2013/0090134 | A1 | 4/2013 | Heshmati |
| 2013/0111044 | A1 | 5/2013 | Cherian et al. |
| 2013/0165157 | A1 | 6/2013 | Mapes |
| 2013/0201286 | A1 | 8/2013 | Schockmel |
| 2013/0322674 | A1 | 12/2013 | Ren et al. |
| 2013/0332007 | A1 | 12/2013 | Louboutin |
| 2014/0095227 | A1 * | 4/2014 | Parker ................... G06Q 30/04 705/5 |
| 2014/0273857 | A1 | 9/2014 | White et al. |
| 2014/0279276 | A1 * | 9/2014 | Tolcher .............. G06Q 20/3255 705/26.81 |
| 2014/0344036 | A1 | 11/2014 | Serad |
| 2015/0042451 | A1 | 2/2015 | Matsumoto |
| 2015/0120558 | A1 | 4/2015 | Andrews |
| 2015/0289207 | A1 | 10/2015 | Kubo |
| 2015/0289295 | A1 | 10/2015 | Granbery |
| 2015/0348146 | A1 | 12/2015 | Shanmugam et al. |
| 2016/0007184 | A1 | 1/2016 | Kulikov |
| 2016/0019726 | A1 | 1/2016 | Joy et al. |
| 2016/0044460 | A1 | 2/2016 | Cornaby |
| 2016/0073264 | A1 * | 3/2016 | Van den Broeck ... H04W 4/021 455/411 |
| 2016/0087959 | A1 | 3/2016 | Park |

FOREIGN PATENT DOCUMENTS

| | | |
|---|---|---|
| CN | 130999523 | 8/2014 |
| CN | 104392501 | 3/2015 |
| CN | 105243689 | 1/2016 |
| WO | 2015100185 | 7/2015 |
| WO | 2015123378 | 8/2015 |

OTHER PUBLICATIONS

Radius Networks, "How to Pop a Pass Using iBeacon Technology", http://developer.radiusnetworks.com/blog/ Downloaded on Nov. 28, 2015, 19 pages.

Masabi, "Transport Operators and Barcode M-Ticketing", London, UK, download date Oct. 28, 2015. http://www.masabi.com/wp-content/uploads/2011/02/Transport-Operators-and-Barcode-mTicketing.pdf.

HopOn, "HopOn Beacon", download date Oct. 28, 2015, 9 pages. http://hopon.co/technology/.

Two Canoes, "Bleu Meetings", download date Oct. 28, 2015, 5 pages. http://twocanoes.com/products/online-services/bleu-meetings.

MTA, "LIRR Seeking Development of Train Ticketing App", Jan. 26, 2013, 2 pages. http://www.mta.info/news/2013/01/26/lirr-seeking-development-train-ticketing-app.

Intercom, "How Mobile Ticket delivery works?", download date Oct. 29, 2015, 3 pages. http://www.intercom.ee/mobile-ticketing-works.

"The Partial European search report", European Patent Application No. 15182143.6, European Patent Office, dated Jan. 21, 2016, 7 pages.

* cited by examiner

VALIDATION IN SECURE SHORT-DISTANCE-BASED COMMUNICATION AND ENFORCEMENT SYSTEM ACCORDING TO VISUAL OBJECTS

BACKGROUND

For a variety of situations and reasons, it may be desirable to control, monitor and validate people's access to an area of interest. For example, it is not uncommon to include a gate to block entrance to a parking lot or secured facility. In another example, mass transit systems, such as subways, often include some form of entrance control to enforce fare payment to ride the subway. Also, other places, like concert halls, stadiums, etc., still have conventional paper tickets, and people are employed to physically validate each individual ticket.

Controlling access to these areas can be automated. For example, a user has a card key, and a reader is installed at a locked entrance. To gain access to the area, the user inserts his card key into the reader or places it in very close proximity to the reader so the reader can read the card key. The information transmitted from the card key may be an ID and/or other information for the user and is processed through appropriate business rules to determine if the user is authorized to access the area. If the user is determined to be authorized, the door is unlocked and the user is allowed to enter.

In other examples, instead of being automated, a person is responsible for monitoring or controlling an area. For example, a security guard is responsible for checking people entering an area. In another example, passengers purchase tickets to ride on a train and after the passengers are on the train, a train conductor checks each person to determine if they have a ticket.

In the situations described above, either a user is required to have to carry an additional card key and physically present the card key to the reader to gain access to the restricted area, which can be a major inconvenience, or personnel, such as a security guard or a train conductor, are needed to control or monitor an area, which is not always cost effective and is susceptible to human error. Furthermore, the security of conventional systems is not optimal. In conventional systems, security codes used to validate the card keys are often stored on readers, and encoded into the card keys. They are highly susceptible to hacking and as a result create a vulnerability of providing unauthorized access to restricted areas.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
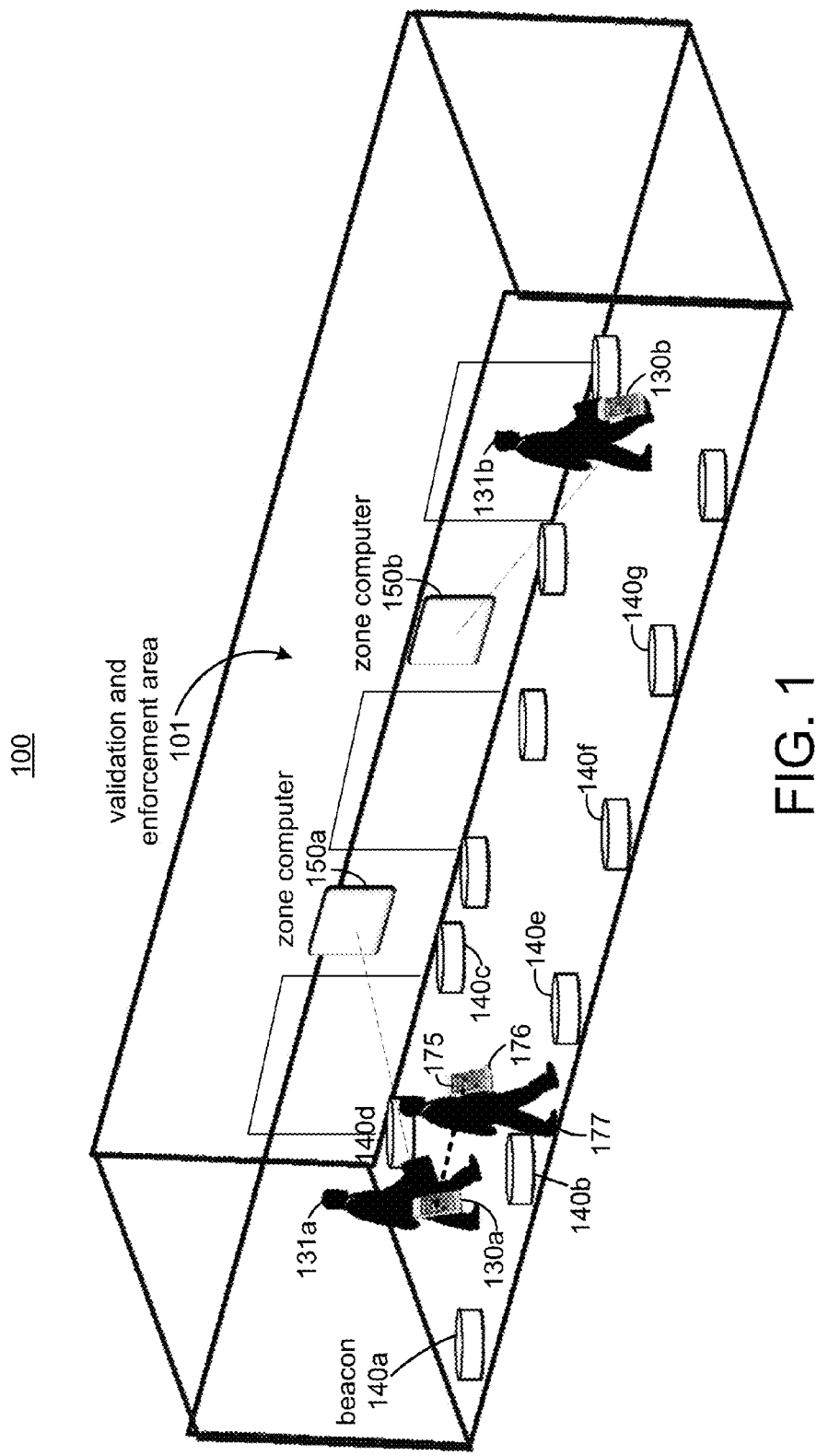
FIG. 1 illustrates a secure short-distance-based communication and enforcement system, according to examples of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A secure short-distance-based communication and enforcement system employs low-powered beacons, zone computers and enforcement computers in a validation and enforcement area. Individuals communicate through their mobile devices with the beacons and zone and enforcement computers to validate that the individuals are authorized to be in the validation and enforcement area and to provide on-the-spot verification that individuals are authorized to be in the validation and enforcement area. The system facilitates secure communication through short-distance-based communication between the mobile devices and the zone and enforcement computers and through on-the-spot unique mobile device identifier (ID) and key generation. The unique mobile device ID and the key that enable the secure communication are generated for a specific mobile device at its current location proximal to a zone computer. The unique mobile device ID may be determined from signals received from beacons for the current location of the mobile device. For example, the unique mobile device ID is unique to the mobile device and a current location of the mobile device when it transmits the mobile device ID to the zone and/or enforcement computer associated with the zone where the mobile device is located.

By employing the short-distance-based, secure communication for message exchange, the mobile device may remain in the user's pocket or bag and engage in activation and validation processes with the zone computer and other external computers to validate an individual. Additionally, the system may include multiple zones but the system employs techniques to minimize cross-talk between mobile devices and zone computers to facilitate secure message exchange and validation of multiple users simultaneously. The secure communication and cross talk minimization of the a secure short-distance-based communication and enforcement system represent significant technical advantages over existing systems. Also, an application running on the mobile device that facilitates security and other functions can easily be remotely updated over a network. However, card keys do not support this feature.

The system may be used in transit scenarios involving buses, trains, taxis, or other vehicles. For validation, the system may be provided for example at the entrance and/or exit of the validation and enforcement area, such as a the entrance to a train station. The entrance may be gated, and validation is performed to open the gate or deny access to the area by closing the gate. For example, an individual can use their Bluetooth-enabled mobile device to pay their fare at turnstiles, fare gates, etc. They can have their fare deducted with the aid of their mobile device while the mobile device remains inside their pockets or bag, or the fare can also be deducted by lightly tapping their mobile device on a zone computer. Also, the system may be used in non-gated stations, or other non-gated environments where the individual does not pass through a gate or some other type of movable physical barrier to enter the validation and enforcement area. For example, the validation and enforcement area may be inside the vehicle or on a train station platform. The system determines whether the individual is in the area and settled inside the area, such as settled inside the bus or settled on the train station platform, before conducting validation, which may include fare payment. Similarly to the gated environment, the fare can be deducted from the mobile device while the mobile device remains inside a pockets or bag, or the fare can also be deducted by lightly tapping the mobile device on a zone computer, but the fare payment is done inside the bus or train or other vehicle rather than at a fare gate.

Also, regardless of whether validation is performed for example at a gated entrance or inside the vehicle, an enforcement computer inside the validation and enforcement area, which may be inside the vehicle, performs on-the-spot verification to determine whether the individual is validated. The enforcement computer may be a mobile device that may be carried by an inspector or some other individual to verify that the passengers are validated and have paid their fares. When an inspector demands a proof of payment, the individual lightly taps their mobile device on the inspector's enforcement computer. Both the devices interact over Bluetooth or some other short-distance wireless communication interface and the inspection result is displayed for the inspector on the enforcement computer. The enforcement computer can be a mobile device carried by the inspector or a stationary computer that is mounted on a physical structure inside the validation and enforcement area. The enforcement device or the user's mobile device may be a wearable device, such as GOOGLE glass, a smart watch, etc., and may be a combination of a mobile device and a separate Bluetooth sensor that is connected to the mobile device whereby communication is enabled via the Bluetooth sensor. The validation and enforcement area may be a fare paid zone where an individual is required to pay a fare to be in the area. A proof of payment can be demanded inside the validation and enforcement area. By way of example, the validation and enforcement area can be inside a bus, train, subway, subway platform, train station, street car platform, etc. Tickets for the fare can vary based on passenger profile (e.g., adult, child, student, senior, etc.), transit type (e.g., bus, subway, train, etc.), reusability (e.g., one time ticket, one day pass, weekly pass, etc.), time of travel (e.g., weekday, weekend, peak hours, off-peak hour, etc.).

FIG. 1 illustrates a secure short-distance-based communication and enforcement system 100, referred to as the system 100. The system 100 is employed at validation and enforcement area 101. The validation and enforcement area 101 may be a geographic area or location and/or a physical structure that individuals can enter and exit. The physical structure may be a mobile structure, such as a vehicle (e.g., bus, train, car, airplane, etc.), or a stationary structure such as a building or some other type of stationary structure. Also, the validation and enforcement area 101 may or may not have physical structures to control entry or exit into validation and enforcement area 101. For example, a validation and enforcement area 101 may be an open area.

The system 100 may be used for a non-gated environment, such as inside a vehicle, train station platform, etc., or for a gated environment, such as a subway entrance through a gate, or for any area where individuals may enter or exit and validation and enforcement of validation can be performed if the individual is detected in the validation and enforcement area 101. The system 100 may be used to execute fare payment for validation or to confirm that the ticket has been purchased and the fare has been paid for enforcement. Furthermore, the validation and enforcement area 101 may be divided into a plurality of sub-locations, also referred to as zones. Validation and enforcement may occur in any of the zones in the validation and enforcement area 101. Multiple individuals can be simultaneously validated by the system 100 in a validation mode, and multiple individuals can be simultaneously checked for validation in an inspection mode for enforcement by the system 100.

Individuals in the validation and enforcement area 101 are checked, for example, to determine whether they are approved to be in the validation and enforcement area 101 and/or to grant or deny approval of them being in the validation area. For example, individuals in the validation and enforcement area 101 are supposed to be validated. For validation, the individuals may have engaged in the validation process to be allowed entry into the validation and enforcement area 101 or may have engaged in the validation process after they entered the validation and enforcement area 101. Through an inspection process, the system 100 can determine whether an individual in the validation and enforcement area 101 has gone through validation and is approved to be in the validation and enforcement area 101. Accordingly, enforcement of validation may include determining whether individuals in the validation and enforcement area 101 are approved to be in the validation and enforcement area 101.

Validation may be based on validation rules stored in the zone computers or a backend server or the mobile devices. In one example, validation may include paying a fare associated with the validation and enforcement area 101, such as paying a fare for riding a bus, train or taxi. The validation rules may include rules to determine the amount of fare, such as whether the fare is based on distance or number of stops or whether a single fare is charged for any distance traveled, or based on other fare payment rules. Enforcement may include executing an inspection process to determine whether an individual has been approved to be in the validation and enforcement area 101. In one example, the enforcement includes determining whether an individual paid the fare. "Users" and "individuals" are generally used interchangeably in the present disclosure and refer to anyone or anything that is to be validated and/or inspected in the validation and enforcement area 101.

The system 100 may include end user mobile devices 130 that can each run a validation and enforcement application, shown as validation and enforcement applications 132 for the mobile devices 130, to receive information from beacons 140 and exchange information with zone computers 150 to facilitate validation in the validation and enforcement area 101. Mobile devices 130a and 130b are shown for users 131a and 131b respectively but of course, any number of individuals using mobile devices may be validated by the system 100. Also, multiple beacons 140, including beacons labeled 140a-d, and multiple zone computers 150, including zone computers labeled 150a-b, are shown, however, any number of beacons and zone computers may be included in the system 100 depending on various factors, such as how many users need to be processed simultaneously in the validation and enforcement area 101.

The beacons 140 are hardware that can broadcast beacon signals. The beacons 140 may be standalone devices or incorporated into another system. A zone computer and/or an enforcement computer may have a beacon. The beacons 140 broadcast beacon signals at a short distance, such as up to 10 meters or a much shorter distance, such as up to 4 centimeters. For example, the beacons 140 may be Bluetooth, Bluetooth Low Energy (BLE), or near-field communication (NFC) beacons. The beacons 140 may be part of a local positioning system, such as IBEACONS, that are used to wirelessly determine the position of the mobile devices 130 inside the restricted area 101. The beacons 140 may be positioned at strategic locations inside the validation and enforcement area 101 to facilitate accurate detection of a user within the validation and enforcement area 101. The broadcast range and power of the beacons can be tuned per the environment. For example, the broadcast range of the beacons is tuned to cover the boundaries of their respective zones. For example, the beacons 140 can broadcast towards the inside of their respective zone and may have a range to cover their zone but not much farther to prevent accidentally validating a mobile device that may be adjacent the validation and enforcement area 101 but not in it. Also, the validation and enforcement applications 132 running on the mobile devices 130 can filter out the beacons below a specific power range or accuracy or angle or azimuth or distance. Also, each of the zone computers 150 may be associated with a different zone in the validation and enforcement area 101, and a mobile device in a zone can identify the zone computer for the current zone based on location information determined from signals received from the beacons in the zone. The beacons 140 broadcast a signal that invokes a validation process between the mobile devices 130 and the zone computers 150. For example, after receiving signals from the beacons 140a-d, the mobile device 130a communicates with the zone computer 150a to validate the user 131a, and similarly, the mobile device 130b communicates with the zone computer 150b to validate the user 131a.

In one example, the beacons 140 and the zone computers 150 may be provided at the entrance and/or exit of the validation and enforcement area 101. For example, the beacons 140 and the zone computers 150 may be provided at a gated entrance to control access to the validation and enforcement area 101. If a user is validated at the gate, the gate is opened to allow the user to enter. Validation at the gated environment is further described with respect to FIG. 3.

As shown in FIG. 1, the system 100 also includes an enforcement computer 175. Although a single enforcement computer 175 is shown, there may be multiple enforcement computers in the validation and enforcement area 101. The enforcement computer 175 may be a mobile device carried by a person, shown as the enforcement person 177, checking the validation of the users 130. For example, the enforcement computer 175 is in close proximity to the mobile device 130a as shown in FIG. 1 and communicates with the mobile device 130a to check the validation of the user 131a.

Although the enforcement computer 175 is shown as a mobile device, the enforcement computer 175 may be a stationary computer mounted on a physical structure, such as on a wall or another structure that generally does not move within the validation and enforcement area 101. The enforcement computer 175 for example runs an inspection application 172 to check the validation of the users 130.

The enforcement computer 175 may include an inspection beacon 176 that broadcasts an inspection signal through a short-distance communication interface in the enforcement computer 175. If the mobile devices 130 receive the inspection signal, the validation and enforcement applications 132 for the mobile devices 130 are placed in inspection mode to disable validation, such as disabling buying fare products, and disabling fare payment, through the validation and enforcement applications 132 and to facilitate checking the validation of the users 132. By disabling fare payment or other validation actions that can be performed by the user, it prevents the user from being able to only pay the fare when they are being inspected or when they see an enforcement officer inspecting passengers or are informed by other means of an enforcement officer inspecting passengers. Instead, the user has to pay the fare prior to entering inspection mode on the mobile device and thus encourages users to pay the fare righteously when entering the validation and enforcement area 101. Upon checking validation, if the user is indicated as not being validated, the user may be removed from the validation and enforcement area 101, or charged an additional penalty fee in addition to the fare, or some other action may be performed in response to determining the user has failed to validate.

In one example, instead of, or in addition to the enforcement computer 175 including the inspection beacon 176, the enforcement computer 175 can place the beacons 140, which may have previously been used for validation, into inspection mode. In the inspection mode, the beacons 140 broadcast the inspection signal to facilitate the checking of the validation of the users 130. Assuming the beacons 140 can operate in different modes, when the beacons are not in inspection mode, the beacons 140 operate in validation mode and broadcast a validation signal to facilitate validation. The inspection signal and the validation signal may include a beacon ID. The beacon ID may identify the signal as an inspection signal or a validation signal. The signal may carry additional information that can identify it as inspection signal or a validation signal. For example, a unique ID in a beacon signal can identify the beacon signal as an inspection signal or a validation signal.

If the enforcement computer 175 is a stationary computer, it can inspect all the passengers that are in the validation and enforcement area 101, and may identify a particular seat or other location where the passenger is located based on triangulation and beacon information. Either the mobile device or the enforcement computer may determine the location. The stationary enforcement computer 175 can update a backend server on enforcement status, and the enforcement officer can come on an as-need basis.

The mobile devices 130 and the enforcement computer 175 (assuming it is a mobile device) may be any computer that a user may carry and that can run an application. Examples of the computers may include mobile phones, tablets, wearable computers, such as GOOGLE glass or smart devices embedded into clothing, a smart watch, fitness tracker, or wireless enabled shoes, or some other type of mobile computer. The mobile devices 130 and the enforcement computer 175 may include short-distance wireless communication interfaces that can wirelessly communicate with beacons 140 and zone computers 150 and the enforcement computer 175 when in proximity to the beacons 140 and the zone computers 150 and the enforcement computer 175. Also, in addition to receiving signals from the beacons 140, the mobile devices 130 and the enforcement computer 175 themselves may operate as a beacon and broadcast a beacon signal or act as a peripheral, enabling services and/or characteristics, or act as a central computer and start searching for peripherals with certain services and/or characteristics and/or name and/or other unique identifiers. The mobile devices 130 and the enforcement computer 175 may include a beacon. In one example, a short-distance communication interface in a mobile device or the enforcement computer 175 can broadcast a beacon signal to initiate communication.

In one example, the short-distance wireless communication interfaces may include NFC interfaces. NFC is a set of standards for smartphones and other mobile devices to establish radio communication with each other and other computers by touching them together or bringing them into close proximity. The close proximity may be a few inches or few centimeters (e.g., 4 centimeters). Other wireless interfaces may be used. For example, Bluetooth may be used and has a longer range, but may consume more battery power and is more susceptible to cross talk. In another example, BLE or Bluetooth 4.0 or future versions of Bluetooth wireless interfaces may be used. BLE is a wireless technology that is intended to provide reduced power consumption when compared to Bluetooth but has a similar range to Bluetooth. The components of the system 100 may have one or multiple types of short-distance wireless interfaces, which may have ranges from a few centimeters to a few meters. In another example, the range is up to 100 feet. The zone computers 150, mobile devices 130 and the enforcement computer 175 may include other communication interfaces as well, which are wired or wireless and may be network interfaces for communicating packets over a local area network and/or a wide area network. However, communication between the beacons 140/inspection beacon 176 and the mobile devices 130 and communication between the zone computers 150 and the mobile devices 130 and communication between the enforcement computer 175 and the mobile devices 130 may rely on short-distance wireless interfaces for communication with each other. Communication via a network interface may be for exchanging messages with a backend server via a network, which may be done for validation and inspection.

The beacons 140 and beacon 176 may include small computers that may be attached to or embedded in a physical infrastructure. The beacons 140 and beacon 176 may broadcast a message every x milliseconds (ms), where x>1 ms and may be less than 200 ms but other intervals may be used and may be based on the environment and use cases. The message may include a unique ID or a set of unique IDs or a combination of generic IDs and unique IDs. In one example, at least one part of the ID is generic and the other part is unique. In one example, the ID may include a universally unique identifier (UUID) a major ID and/or a minor ID. For example, one of the identifiers is generic (e.g., UUID and/or the major ID) and may be the same for all beacons that belong to or are for a particular entity, such as for the same company or the same mass transit system, or may vary between different entities or restriction level within the same company or mass transit system. The other unique ID (e.g., minor ID) may help identify a particular location or sub-location. For example, the major ID may be the same for all beacons that belong to a particular location within the system, such as a specific rail station or a bus stop or train, and the minor ID may be different for each subway car or can be unique to the beacon and can be associated with a particular sub-location within a location. Also, the major ID or the minor ID may identify the beacon as an inspection beacon or a beacon for validation.

The mobile devices 130 listen for the broadcasts from the beacons 140, which may contain the unique identifiers for each beacon, or inputs from which the unique identifiers may be calculated or computed or derived or looked up in an internal data store. When a mobile device is in range of one or more of the beacons 140, unique identifiers received from the beacons at the mobile device may invoke a detection mode in the mobile device to determine whether the mobile device is in proximity to at least one of the zone computers 150 or the enforcement computer 175 in the validation and enforcement area 101. This is referred to as detection or detection mode. In detection mode, to determine whether the mobile device is in proximity to a zone computer or the enforcement computer 175, the unique beacon identifiers, signal strength (such as received signal strength indicator (RSSI), transmission power, and/or received Power) of the beacon's broadcasts, broadcast zone, broadcast accuracy, azimuth and/or angle of the beacon signal (e.g., calculated from the received wireless broadcast) are used to identify the location of the mobile device. If the mobile device detects that it is in the validation and enforcement area 101, it may engage in communication with the zone computer or the enforcement computer 175 for validation or enforcement. This may involve the mobile device getting into a peripheral mode, wherein the mobile device may start sending message broadcasts over the wireless interface (e.g. Bluetooth 4.0), like a beacon. For example, the mobile device acts as a Bluetooth peripheral and advertises, broadcasts, transmits, and/or enables its services and/or characteristics using one or more of unique mobile IDs. The zone computer or the enforcement computer 175 may use the unique mobile device ID to identify the mobile device or the services/characteristics advertised, broadcasted, transmitted, and/or supported by the mobile device or the fare payment application on the mobile device. In another example, the zone computer or the enforcement computer 175 broadcasts a message indicating that it is available for validation or enforcement and the mobile device ID which is calculated by the computer is included in the message. The mobile device receives the message, determines whether the mobile device ID in the message matches the mobile device ID calculated by the mobile device, and if it does match, initiating a message exchange for authentication and validation.

The zone computers 150 include computers that may be provided in the validation and enforcement area 101 for authentication and validation of users in the validation and enforcement area 101. A zone computer may support an entire validation area or a zone in the validation area. The zone computers 150 engage in message exchange and validation processes with the mobile devices 130 for authentication and validation after the mobile devices enter peripheral mode, which may be invoked after the mobile devices 130 detect that they are in the validation and enforcement area 101 and that the mobile devices 130 are settled. For example, a process is executed to establish a secure communication channel between a mobile device and a zone computer through run-time key generation, which may be based on the ID of beacons and other information. Messages may be exchanged via the secure communication channel to perform validation. In one example, validation may include fare-based validation, such as when payment of a fare is required.

Similarly, the enforcement computer 175 engages in secure message exchange and processes with the mobile devices 130 for authentication and to check validation, which is further described below. Both the zone computers 150 and the enforcement computer 175 may be connected to a back-end server via the Internet or another wide area network to provide updates and perform other functions which may include validation-related functions.

Figure 2:
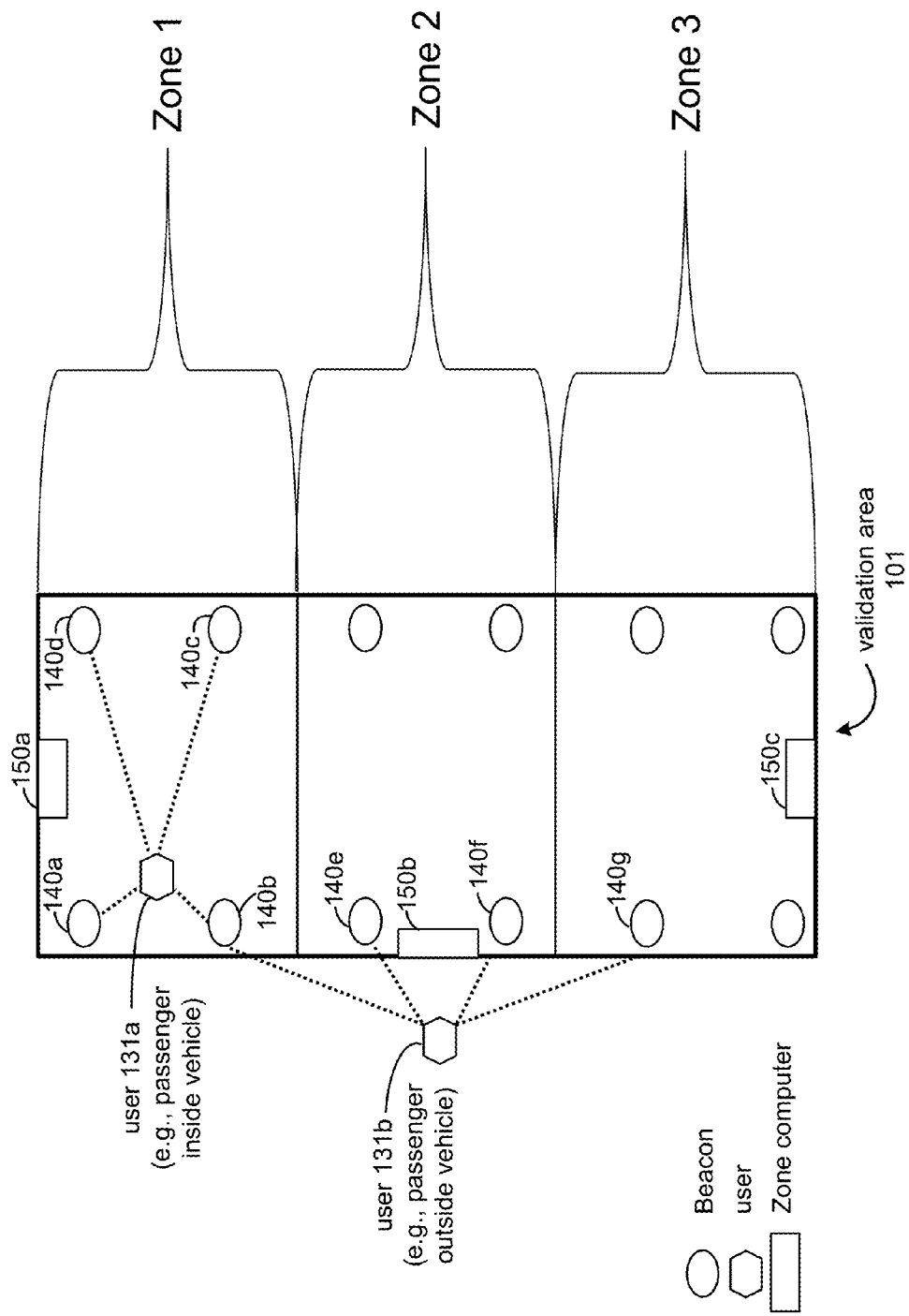
FIGS. 2 and 3 show examples of zones in a validation area.
Figure 3:
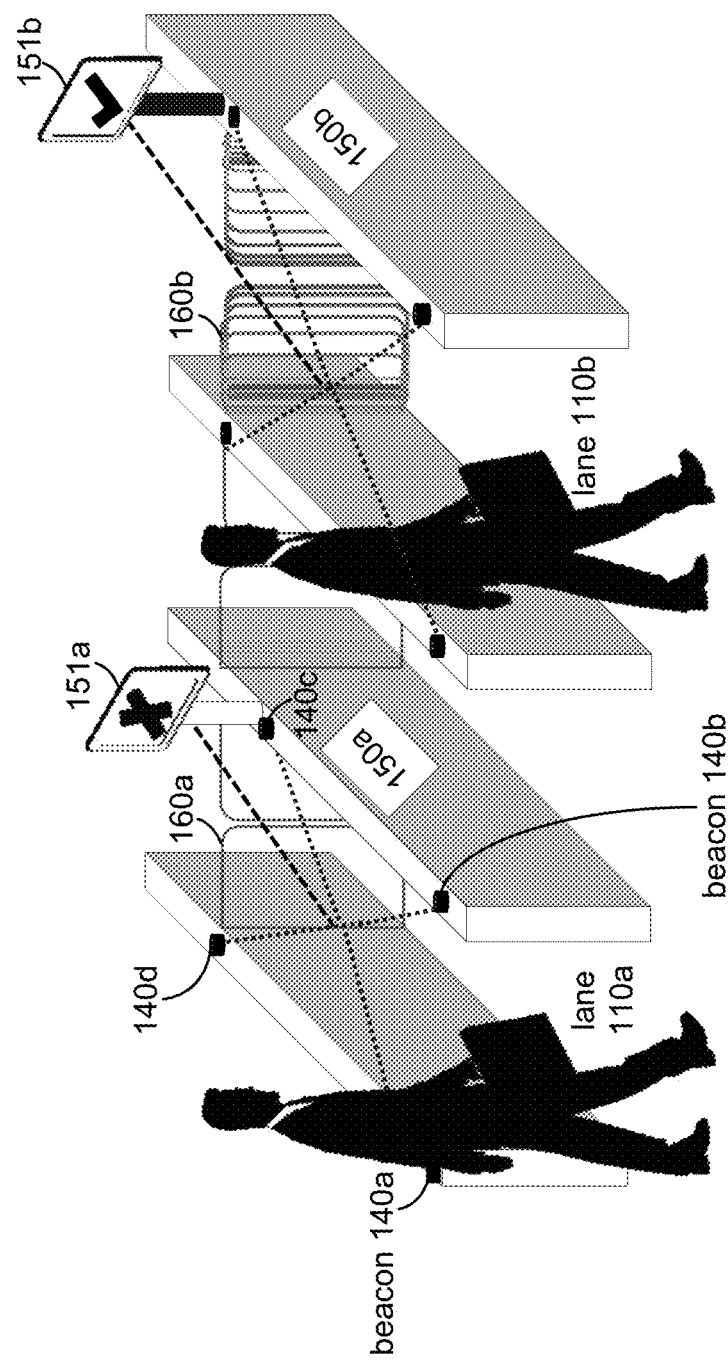

FIGS. 2 and 3 show examples of validation in the validation and enforcement area 101. FIG. 2 shows an example of validation performed in a non-gated environment, such as validation performed after the users 130 enter the validation and enforcement area 101. This may include charging a fare after the users 130 enters a bus or after the users 130 enter a subway car. FIG. 3 shows an example of validation performed in a gated environment, such as validation performed at an entrance of a subway station. Regardless of whether the validation and enforcement area 101 is a gated environment or a non-gated environment, when the users 130 are inside the validation and enforcement area 101, the enforcement computer 175 may be used to check the validation of the users 130 such as shown in FIG. 1 and further described below.

FIG. 2 shows an example of a configuration of beacon placement in multiple zones 1-3 in the validation and enforcement area 101. The validation and enforcement area 101 may be inside a vehicle, such as a subway car. The subway car may have multiple zones 1-3, which may be adjacent doors to get in and out of the subway car. In this example, user 131*a* is in zone 1, and user 131*b* is outside zone 2 and outside the subway car (i.e., outside validation and enforcement area 101). When the user 131*a* enters zone 1, the mobile device 130*a* for the user 131*a* receives the signals from beacons 140*a-d*. The validation and enforcement application 132*a* running on the mobile device 130*a* enters detection mode and detects that it is in a zone in the validation and enforcement area 101 and is in proximity to the zone computer 150*a*. For example, the validation and enforcement application 132*a* uses the beacon information from signals received from the beacons 140*a-d* to determine its location and calculate the passenger's position in zone 1. The beacon signals relative strength, angle, azimuth, etc. and the location information derived from the major ID or minor ID or carried in the payload of the signals are used to determine the precise location of the user 131*a*. The precise location may indicate that the mobile device 130*a* or the user 131*a* is in zone 1 and may further identify an area within zone 1, such as a seat.

At the current location of user 131*b*, the mobile device 130*b* of user 131*b* receives beacon signals from beacons 140*b* and 140*e-g*. The beacon signals relative strength, angle, azimuth, etc. and the location information derived from the major ID or minor ID or carried in the payload of the signals from beacons 140*b* and 140*e-g* are used to determine the precise location of the user 131*b*. Based on this information, the validation and enforcement application 132*b* may determine that the user 131*b* is outside the validation and enforcement area 101 and not enter peripheral mode. For example, the validation and enforcement application 132*b* may determine that the signals are from beacons assigned to different zone computers, such as zone computers 150*a-c*. Also, from the signal strength, angle, and azimuth, the validation and enforcement application 132*b* may determine that the signals from beacons 140*b* and 140*g* have a signal strength below a threshold, and an angle and azimuth that are indicative of beacons associated with different zones and different zone computers. Thus, the validation and enforcement application 132*b* may ascertain that the closest beacons are beacons 140*e-f*. The validation and enforcement application 132*b* may further determine that since it is not receiving signals, or receiving signals that are too weak, from at least three or all four beacons for the same zone, that it is outside the validation and enforcement area 101. Therefore, the validation and enforcement application 132*b* does not enter peripheral mode and does not engage in validation.

Also, the zone computers 150 may be connected to displays (not shown) to provide indication to the user of whether they are validated or not. For example, zone computer 150*a* may display a message indicating user 131*a* is validated. If multiple users are in the zone, a user ID may be displayed along with an indication of whether the user is validated. For example, a check mark indicates a person is validated. If the person is not validated, the display may show an X, and may provide additional information, such as "See Attendant" or "Insufficient Funds" if the user's account does not have sufficient funds to pay a fare. Also, external systems may be invoked, such as to alert attendants or to automatically replenish funds in a user's account or change user's access privileges.

FIG. 3 shows an example of validation that may be performed for a gated validation and enforcement area 101. The lanes 110 may be zones of an entry point. The beacons 140 and/or the zone computers 150 may be embedded in the physical structures of the lanes 110. The zone computers 150 may electronically control movable physical barriers 160, such as gates, turnstiles, etc. Each electronically-controlled movable physical barrier may be located in a different zone. For example, movable physical barriers 160*a-b* in lanes 110*a-b* allow or deny access to the validation and enforcement area 101. Also, the zone computers 150 may be connected to displays 151, such as displays 151*a-b*, to provide indication to the users 131 of whether they are approved to enter the validation and enforcement area 101 or not. Other information may also be displayed. For example, an arrow indicates a lane is open. The check mark shown on the display 151*b* indicates a user is validated and the gate opens. If the person is not validated, the display may show an X, such as shown on display 151*a*, and may provide additional information, such as "See Attendant" or "Insufficient Funds" if the user's account does not have sufficient funds to pay a fare. Also, external systems may be invoked, such as to alert attendants or to automatically replenish funds in a user's account.

Figure 4:
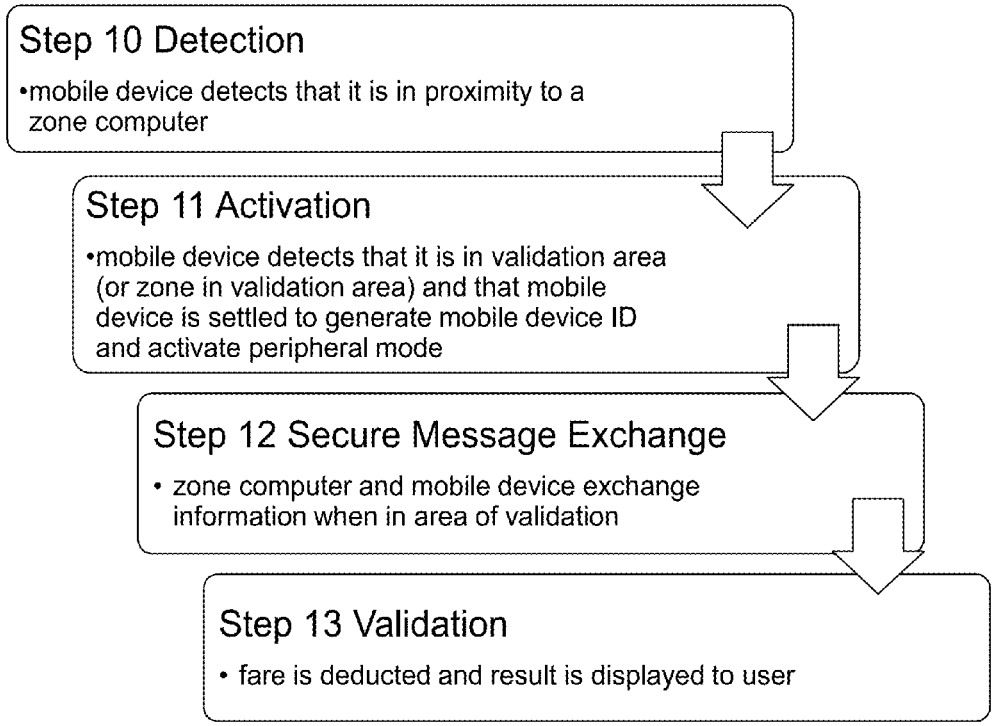
FIG. 4 shows a high-level flow chart of steps that may be performed for validation or enforcement by the a secure short-distance-based communication and enforcement system, according to examples of the present disclosure.
Figure 5:
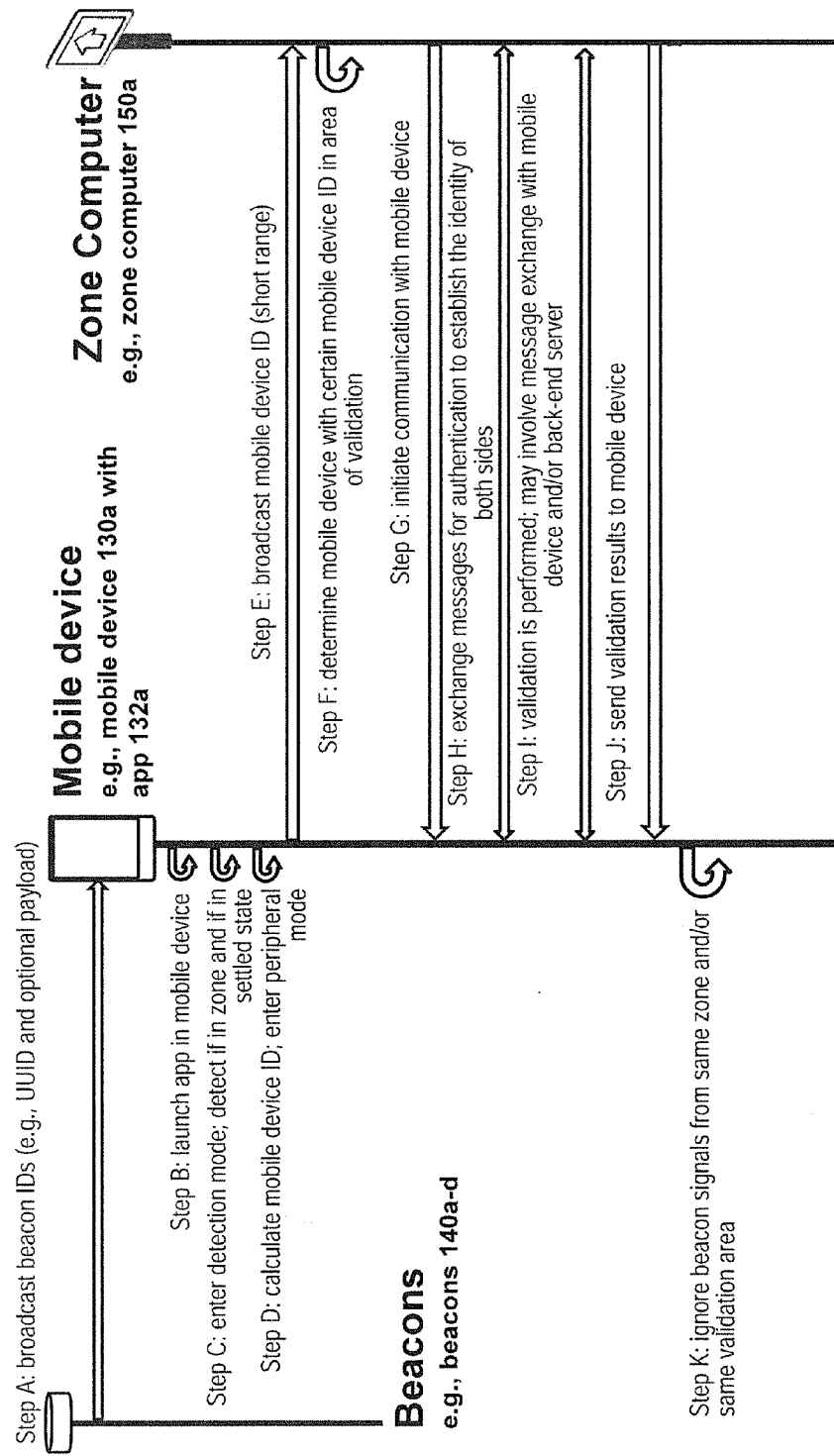
FIGS. 5-6 shows additional details of the steps of FIG. 4, according to examples of the present disclosure.

FIG. 4 shows a high-level flow chart of steps performed by the system 100, and FIG. 5 shows additional details of the steps and the interaction between the various sub-systems of the system 100, including the mobile devices 130, beacons 140, and zone computers 150 that perform the steps, according to an embodiment. Referring to FIG. 4, steps are shown for detection at step 10, activation at step 11, exchange at step 12 and validation at step 13.

At step 10, for detection, a mobile device determines whether it is in proximity to a zone computer (e.g., determining whether the mobile device is a validation area of a zone computer) based on information received from beacons. Determining proximity to a zone computer may include determining whether the mobile device is within a predetermined distance to a beacon or a plurality of beacons associated with a zone computer. Determining the distance to a beacon may be estimated based on signal strength, signal angle and azimuth, etc. According to an example, mobile device 130a shown in FIG. 1 receives signals from the beacons 140a-d. Each signal includes a beacon ID, e.g., a UUID, major ID and/or a minor ID. Each beacon ID may be determined so that it can be used to identify its location, such as station, zone, etc. The beacons 140a-d may also transmit a small payload containing the location information or any other information that can help to calculate the location information.

In one example, triangulation-based detection is performed to determine whether the mobile device 130a is in a zone. For example, the validation and enforcement application 132a running on the mobile device 130a registers for beacon notifications with a specific unique ID or IDs or part of the IDs, e.g. UUID and/or major ID and/or minor ID or a list of UUIDs, major IDs and/or minor IDs. For example, the UUIDs or the major IDs may be the same for all beacons provided by the same entity, such as all beacons for the same mass transit company or all beacons for the same train station. So, for example, the UUIDs broadcasted by the beacons 140 may be the same because they are for the same entity or same train station. The validation and enforcement application 132a stores a list of UUIDs, major IDs and minor IDs that it may respond to. The mobile device 130a listens for broadcasted unique IDs from beacons. If the unique IDs of the beacon signals that are received are registered, such as stored in the list, the validation and enforcement application 132a determines whether it is in a zone in the validation and enforcement area 101. For example, in response to recognizing broadcasts from beacons 140a-d or at least one of the beacons, using beacon signal attributes such as distance and azimuth, the validation and enforcement application 132a in mobile device 130a determines that it is within a predetermined distance (e.g., within 1 meter) to at least 1 of the beacons 140a-d. Thus, the validation and enforcement application 132a determines that it is in a zone, such as zone 1, and then proceeds to activation at step 111.

In another example, tap-based detection is performed. For example, the user lightly taps the mobile device 130a on or near beacon 140a or at zone computer 150a if it also acts as a beacon. The range of the beacon may be tuned so that the mobile device 130a needs to be in close proximity to detect the beacon, such as within 3-4 centimeters, or the mobile device might take into consideration the signal strength, zone, accuracy and other factors of the beacon broadcast to determine the proximity with the beacons, and decide accordingly. If a beacon unique ID or IDs are received that are registered at the mobile device 130a, in response to the tapping or placement in close proximity to the beacon, the application 132a performs activation at step 11. In another example, an intent of the user to enter validation is determined for example based on measurable user actions performed on the mobile device, such as shaking the mobile device twice, audible command spoken into the mobile device, etc.

At step 11 shown in FIG. 4, after detecting proximity to a zone computer at step 10, activation is performed. For example, activation may include determining whether the mobile device 130a of the user 131a is in a zone in the validation and enforcement area 101. FIG. 2 shows an example where the mobile device 130a is detected in zone 1. Activation may also include determining whether the mobile device 130a is in a settled state for a non-gated area, such as shown in FIG. 2. For the gated environment, such as shown in FIG. 3, a settled state need not be determined for activation. The settled state may be a mobile device that is determined to be stationary in the validation and enforcement area 101 for a predetermined period of time, and may be determined for the non-gated enforcement and validation area to prevent improper fare charging such as when a user quickly moves in and out of the enforcement and validation area 101 as is described below.

If the mobile device 130a is determined to be in a zone in the validation and enforcement area 101 and in the settled state for a non-gated area, a run-time unique mobile device ID and encryption keys are calculated for the mobile device 130a for future secure message exchange with the zone computer 150a, and a peripheral mode is activated. The peripheral mode is entered to communicate with the zone computer associated with the current location of the mobile device 132a, which is zone computer 150a for zone 1 in FIG. 2.

Determining whether the mobile device 130a is in a settled state may be performed to prevent accidentally entering into validation for fare payment. For example, the settled state indicates whether a mobile device is in a predetermined location for a predetermined amount of time. For example, if a user enters a bus with a validation and enforcement area and then exits the bus immediately without riding the bus, the mobile device of the user may receive a signal from a beacon in the bus. However, because the user does not settle in the bus, validation is not performed and the user is not charged.

The settled state may be determined from motion sensors and based on time. Measurements from different sensors inside the mobile device 130a (e.g., accelerometer, gyroscope, and/or motion co-processor) may be used to determine whether the mobile device 130a is stationary or is moving, and whether the mobile device 130a is moving in a direction outside the zone or outside the validation area and a rate of the movement. Also, the motion of the vehicle is determined in order to determine whether the mobile device is stationary or in motion while the vehicle is mobile or while the vehicle is stationary. If the mobile device 130a is moving while the vehicle is in motion, then the mobile device 130a may still be considered to be in a settled state but other factors may be considered. Also, the length of time the mobile device 130a is stationary may be ascertained from the sensor measurements to determine whether it is in a settled state. In one example, the validation and enforcement application 132a activates the peripheral mode if the mobile device 130a is determined to be in a settled state, or the vehicle is in motion for a predetermined period of time, and/or the mobile device 130a has been inside the vehicle for a certain amount of time.

Unique ID determination for the mobile device may vary depending on how detection was performed. For example, if triangulation-based detection was performed, the unique IDs (like major ID, minor ID and optional payload) from the beacons used for triangulation may be used to calculate the unique ID or IDs for the mobile device. If tap-based detection was performed, the unique ID or IDs may be calculated using the unique ID or IDs from the beacon that was tapped (e.g. major ID, minor ID and optional payload from the beacon that was tapped). The peripheral mode is enabled in the mobile device to communicate with the zone computer for the lane using the unique IDs for the services and/or characteristics. Examples of unique ID calculation functions are described below.

In one example, the unique ID or IDs for the mobile device are calculated using the information received from the beacons and/or zone computer as the input. Thus, the unique ID is specific to the current location of the mobile device. The unique ID is not valid (or may not be valid) at a different location The current location may be a particular zone in the validation area 101 or a specific seat in the zone.

A unique ID calculation function may be used to calculate the unique ID or IDs for the mobile device from the information received from one or more beacons. An example of a unique ID calculation function is described below. Assume the following: Row=Minor ID/1000; Sequence=Minor ID %1000, whereby % represents the modulo operator; Location=Major ID/1000; and Sub-Location=Major ID %1000.

If triangulation-based detection was used at step 10, the following steps may be performed to calculate the unique ID or IDs for the mobile device. The detected beacons are sorted based on the signal strength (like RSSI, transmission power, received power, etc.) in descending order. Beacons may be filtered, e.g., removed from the list, if their received signal strength indicator does not fall within a predetermined value, or if they proximity is unknown or if the azimuth and angle doesn't meet predetermined requirements or a combination of these. For example, if the signal strength is too weak, such as determined by comparing the signal strength to a predetermined threshold, the corresponding beacon may be removed from the list. Then, the top "x" beacons from the list are identified where x>1. In one example, x is greater than or equal to 3. If a plurality of beacons from the top "x" beacons have the required signal strength, then, the major ID and minor ID are used to calculate the Row, Sequence, Location and Sub-location information from the beacon signals, which is in turn is used to generate the unique ID or IDs. Beacons in the same lane may have the same location, sub location and row value.

If tap-based detection was used at step 10, then the following is performed with all the beacons that are found in range. At step 1, the beacons are sorted based on signal strength, accuracy, etc. in descending order and the first beacon in the list is identified or they are sorted in ascending order and the last beacon in the list is identified. Checks on the azimuth, angle, distance, accuracy are performed to ensure the mobile device is in the desired proximity of the beacon. At step 2, the signal strength value for this beacon should be greater than or equal to a predetermined value, e.g., <=−30 dB. At step 3, the row, location and sub-location information of the beacon is used to generate the unique ID or IDs.

One example of a unique ID calculation function for either tap-based detection or triangulation-based detection is: Unique ID=[Pre-defined Unique ID Part]+[Location]+[Sub location]+[Row]. In other examples, mathematical functions, such as a conventional hash function, RSA, etc., are employed that use these three values along with other values, to derive the unique ID or IDs. In other examples, mathematical functions can be used to determine these three values, which in turn become input to other mathematical functions to derive the unique ID or IDs. The input values may include current time, location, sub-location, row, sequence, etc.

At step 12 shown in FIG. 4, for message exchange, the mobile device and the zone computer for the zone exchange information for validation. Regardless of the way detection and activation were performed, message exchange occurs in the same way. The zone computer determines whether the mobile device is within its area of validation if the mobile device is within range. The area of validation may be a zone. For example, the area of validation for zone computer 150a is zone 1 shown in FIG. 2. To determine whether the mobile device is within the zone computer's area of validation, the zone computer may use the distance, signal strength, the azimuth and angle of the mobile device relative to the zone computer or a plurality of these values to determine the mobile device's location. The zone computer initiates a connection with the validation and enforcement application on the mobile device if the mobile device is in the area of validation and the mobile device is broadcasting or advertising or transmitting one or more unique IDs and/or has predetermined services and/or characteristics. Then message exchange may occur for validation. For example, the zone computer 150a and the validation and enforcement application 132a on the mobile device 130a may enter into authentication to establish the identity of both sides. After authentication, data is exchanged between the zone computer 150a and the validation and enforcement application 132a for validation. The zone computer 150a and the validation and enforcement application 132a may request additional data resulting in multiple exchanges. In another example, the mobile device may initiate the connection with the zone computer and then engage in authentication and then validation. Authentication in either case may include determination of keys for secure communication.

At step 13 shown in FIG. 4, validation is performed. Validation may be performed the same way regardless of how detection was performed. For example, the zone computer makes a decision on whether the user is validated based on data exchanged with the mobile device, equipment operational data, and/or real-time services hosted on a backend. The equipment operational data may include fare rules (different fare types, concession types, fare validity window, etc.), transfer rules, location information (e.g., zone computer location), etc. The real-time services may include fare payment. In another example, the backend may store authorization information for individuals to determine whether the user is cleared to be in the validation area 101. The decision of whether the user is validated is communicated to the user, such as through a display connected to the zone computer or through the mobile device. For example, the zone computer may send information to the validation and enforcement application related to the validation decision and/or the user's account (e.g., new balance, transaction summary, etc.). The validation and enforcement application may communicate the decision to the user using inbuilt features like haptic feedback, audio notification, visual notification, etc., based on user's preferences.

FIG. 5 shows details of the steps of FIG. 4 and illustrates the interaction between the devices in the system 100 performing the steps. For example, assume user 131a is entering zone 1 and has mobile device 130a running validation application 132a, such as shown in FIGS. 1 and 2. The mobile device 130a interacts with beacons 140a-d and zone computer 150a when performing the steps.

The beacons 140a-d periodically broadcast their unique IDs and optional payload indicating location. At step A, the mobile device 130a receives the broadcasts when in range. At step B, assuming the validation and enforcement application 132a is not already running, the validation and enforcement application 132a is launched for example if the operating system of the mobile device 130a recognizes the beacon IDs as registered beacon IDs. For example, beacon IDs that have a predetermined UUID, major ID and/or minor ID invoke launching of the validation and enforcement application 132a. If tap-based detection is used, the validation and enforcement application 132a may be launched if the user taps on or near a beacon and the unique ID of the beacon is registered. At step C, the validation and enforcement application 132a enters detection mode to determine whether it is in a zone, such as zone 1 and whether the mobile device is in a settled state. Detection may include tap-based detection or triangulation-based detection. After detecting the mobile device 130*a* is in zone 1 and in a settled state, the validation and enforcement application 132*a* enters activation mode to calculate the unique ID of the mobile device 130 based on information derived from the signals of the beacons 140*a-d*. The validation and enforcement application 132*a* enters peripheral mode and a message with the unique ID of the mobile device is broadcasted or sent to a local zone computer, e.g., zone computer 150*a*, at step E. The broadcast may be a short range broadcast, such as using BLE or Bluetooth.

At step F, the zone computer 150*a* receives the message with the mobile device unique ID from the mobile device 130*a* assuming it is within range, and determines whether the mobile device 130*a* is within the area of validation of the zone computer 150*a*. An example of the area of validation may be a zone, such as zone 1. The zone computer 150*a* uses the distance, signal strength and optionally the azimuth and angle of the mobile device 130*a*, which may be determined from the received message, to determine whether the mobile device 130*a* is in its area of validation. For example, in addition to receiving the message from the mobile device 130*a*, the zone computer 150*a* may receive a message from a mobile device in zone 2. However, the zone computer 150*a* determines that only the mobile device 130*a* is currently in its area of validation, i.e., zone 1. Accordingly, the zone computer 150*a* communicates with the mobile device 130*a* for validation but not the mobile device in zone 2 at this instant.

At step G, if the mobile device 130*a* is determined to be in zone 1, the zone computer 150*a* initiates communication with the mobile device 130*a*. For example, the zone computer 150*a* sends an acknowledgment message to the mobile device 130*a* that includes the mobile device unique ID so the mobile device 130*a* knows that the zone computer 150*a* is ready to proceed to validation. In another example, the zone computer 150*a* may broadcast or transmit an acknowledgment message that is encrypted with the mobile device unique ID to the mobile device 130*a*. Only the mobile device 130*a* can decrypt the acknowledgment message sent from the zone computer 150*a* because no other mobile device knows the key. In yet another example, the zone computer 150*a* and the mobile device 130*a* calculate the mobile device unique ID independently using the same inputs and the same function. For example, the inputs for the unique ID calculation function described above may be determined by the mobile device 130*a* and broadcasted or sent to the zone computer 150*a* with the mobile device unique ID. Both the zone computer 150*a* and the mobile device 130*a* store the same function for calculating the mobile device unique ID. The zone computer 150*a* also calculates the mobile device unique ID. The zone computer 150*a* determines if the received mobile device ID matches the calculated mobile device ID to determine whether to continue with the process, e.g., initiate communication, authentication and validation.

Mutual authentication is performed at step H. The mobile device 130*a* and the zone computer 150*a* may exchange messages for authentication to establish identities of both sides. The mutual authentication might result in a generation of a key or set of keys that are then used for further encryption, decryption, enciphering, deciphering, etc. A conventional key encryption algorithm may be used.

At step I, the zone computer 150*a* determines whether the mobile device 130*a* or its user 131*a* is validated. Validation may include exchanging messages with a backend server not shown and/or the mobile device 130*a* to get the information needed to perform validation. In one example, validation may include a fare payment determination and the zone computer 150*a* may determine whether the fare can be paid from a user account for the user 131*a*. At step J, validation results are returned to the mobile device 130*a*. The zone computer 150*a* may also send information to the related to the user's account (e.g., new balance, transaction summary, etc.). At step K, if the user 131*a* is validated, e.g., a fare is paid, the validation and enforcement application 132*a* can mute itself from the beacons in the same fare paid zone to prevent from being double-charged for the duration of the fare validity. If the validation is denied, the zone computer 150*a* can display an indication on a display that validation failed. If the user 131*a* is validated, the zone computer 150*a* can display an indication that the user 131*a* is validated.

After steps E and F are performed, keys may be used for secure communication. As described above, keys may be used to encrypt messages between the mobile device 130*a* and the zone computer 150*a*. Accordingly, the key may be used for secure communication between the mobile device 130*a* and the zone computer 150*a*. Also, the mobile device unique ID and/or the key are run-time. For example, they may be generated in real-time for the validation process and are only valid for the current time and location and for the particular mobile device. This provides additional security by improving the robustness of the key. In another example, MACing might be used to secure the communication between the mobile device 130*a* and the zone computer 150*a*. In another example, both encryption and MACing might be used to secure the communication between the mobile device 130*a* and the zone computer 150*a*.

At step I, validation may vary depending on whether information for validation is stored locally or stored in a backend server. For example, for a "stored value" system, information for validation is stored locally on the mobile device in a secure manner. For example, information, such as user profile, balance amount, passes and concession information are stored securely on the mobile device. In a "credential" systems, the information is stored on a backend server (e.g., the cloud), and the mobile device only stores credentials, such as user account number, and the information is retrieved from the backend server in real time for completing validation or enforcement of transactions.

Figure 6:
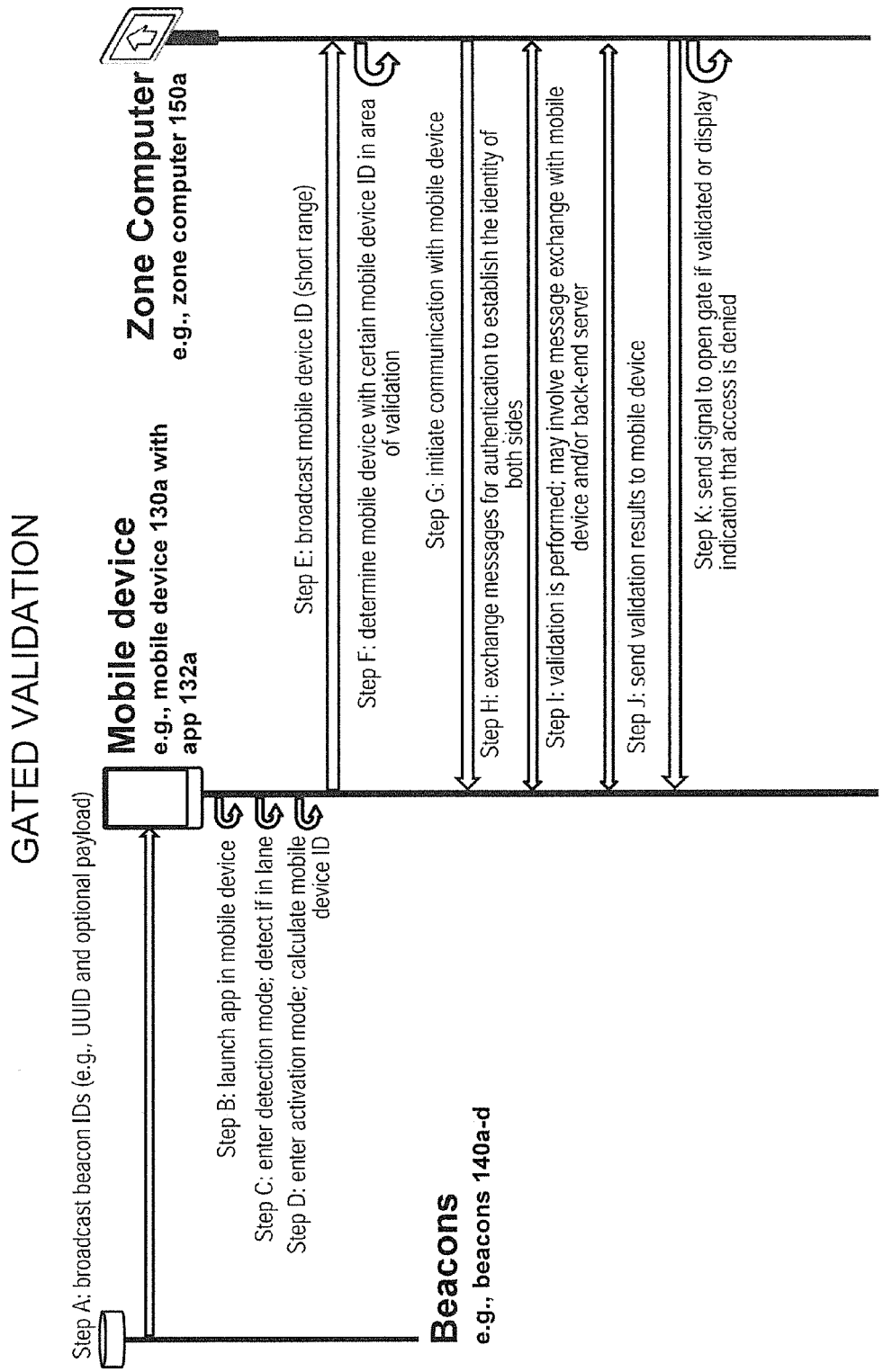

FIG. 6 shows details of the steps of FIG. 4 for a gated validation and enforcement area, such as shown in FIG. 3. For example, in FIG. 3, assume user 131*a* is entering lane 110*a* and has mobile device 130*a* running validation and enforcement application 132*a*, such as shown in FIGS. 1 and 2. The mobile device 130*a* interacts with beacons 140*a-d* and zone computer 150*a* when performing the steps.

The beacons 140*a-d* periodically broadcast their unique IDs and optional payload indicating location. At step A, the mobile device 130*a* receives the broadcasts when in range. At step B, if the validation and enforcement application 132*a* isn't already running, the validation and enforcement application 132*a* is launched for example if the operating system of the mobile device 130*a* recognizes the unique IDs of the beacons as registered unique IDs. For example, beacon IDs that have a predetermined UUID and/or major ID and/or minor ID invoke launching of the validation and enforcement application 132*a*. If tap based detection is used for the beacons, the validation and enforcement application 132*a* may be launched if the user taps on or near a beacon and the unique IDs of the beacon is registered. At step C, the validation and enforcement application 132*a* enters detection mode to determine whether it is in a lane, such as lane 110a. Detection may include tap-based detection or triangulation-based detection. After detecting the mobile device 130a is in lane 110a, the validation and enforcement application 132a enters activation mode to calculate the unique ID or IDs based on information from the beacons and a message with the unique ID or IDs may be broadcasted or sent to a local zone computer, e.g., zone computer 150a, at step E. For example, a mobile device unique ID, which includes the calculated unique ID or IDs, is broadcasted by the mobile device 130a. The broadcast may be a short range broadcast, such as using BLE, Bluetooth 4.0.

At step F, the zone computer 150a receives the broadcasted message with the mobile device unique ID from the mobile device 130a assuming it is within range, the zone computer 150a validates that the broadcasted message contains the unique ID or IDs related to the sub-location and determines whether the mobile device 130a is within the area of validation of the zone computer 150a. An example of the area of validation is shown in FIG. 3, such as the lane 110a. The zone computer 150a uses the distance, signal strength and optionally the azimuth and angle of the mobile device 130a, which may be determined from the received message, to determine whether the mobile device 130a is in its area of validation. For example, in addition to receiving the message from the mobile device 130a, the zone computer 150a may receive a message from a mobile device around the lane 110b. However, the zone computer 150a determines that only the mobile device 130a is currently in its area of validation, i.e., lane 110a or has the correct unique ID or IDs. Accordingly, the zone computer 150a will only communicate with the mobile device 130a for validation at this instant.

At step G, if the mobile device 130a is determined to be in lane 110a, the zone computer 150a initiates communication with the mobile device 130a using the unique ID or IDs as a reference. For example, the zone computer 150a sends an acknowledgment message to the mobile device 130a that includes the mobile device unique ID so the mobile device 130a knows that the zone computer is ready to proceed to validation. In another example, the zone computer 150a may broadcast or transmit an acknowledgment message that is encrypted with a key to the mobile device 130a. Only the mobile device 130a can decrypt the acknowledgment message sent from the zone computer 150a because no other mobile device knows the key. In yet another example, the zone computer 150a and the mobile device 130a calculate the mobile device unique ID independently using the same inputs and the same function. For example, the inputs for the unique ID calculation function described above may be determined by the mobile device 130a and broadcasted or sent to the zone computer 150a with the mobile device unique ID. Both the zone computer 150a and the mobile device 130a store the same function for calculating the mobile device unique ID. The zone computer 150a also calculates the mobile device unique ID. The zone computer 150a determines if the received mobile device ID matches the calculated mobile device ID to determine whether to continue with the process, e.g., initiate communication, authentication and validation.

Mutual authentication is performed at step H. The mobile device 130a and the zone computer 150a may exchange messages for authentication to establish identities of both sides. The mutual authentication might result in a generation of a key or set of keys that are then used for further encryption, decryption, enciphering, deciphering, etc. A conventional key encryption algorithm may be used.

At step I, the zone computer 150a determines whether the mobile device 130a or its user 131a is validated. Validation may include exchanging messages with a backend server not shown and/or the mobile device 130a to get the information needed to perform validation. In one example, validation may include a fare payment determination and the zone computer 150a may determine whether the fare can be paid from a user account for the user 131a. At step J, validation results are returned to the mobile device 130a. At step K, the zone computer 150a sends a signal to open gate 160a for the lane 110a if the user 131a is validated. The signal may be an internal signal if the gate 160a is part of the system 100 or it may be transmitted to an external system if the gate 160a is part of an external system. If the validation is denied, the zone computer 150a can display an indication on the display 151a that access to the restricted area is denied. If the user 131a is validated, the zone computer 150a can display an indication on the display 151a that the they are approved to access (or exit) the restricted area.

After steps E and F are performed, keys may be used for secure communication. As described above, the keys may be used to encrypt or encipher the messages between the mobile device 130a and the zone computer 150a. Accordingly, the key may be used for secure communication between the mobile device 130a and the zone computer 150a. Also, the mobile device unique ID and/or the key are run-time. For example, they may be generated in real-time for the validation process and are only valid for the current time and location and for the particular mobile device. This provides additional security by improving the robustness of the key. In another example, MACing might be used to secure the communication between the mobile device 130a and the zone computer 150a. In another example, both encryption and MACing might be used to secure the communication between the mobile device 130a and the zone computer 150a.

Figure 7:
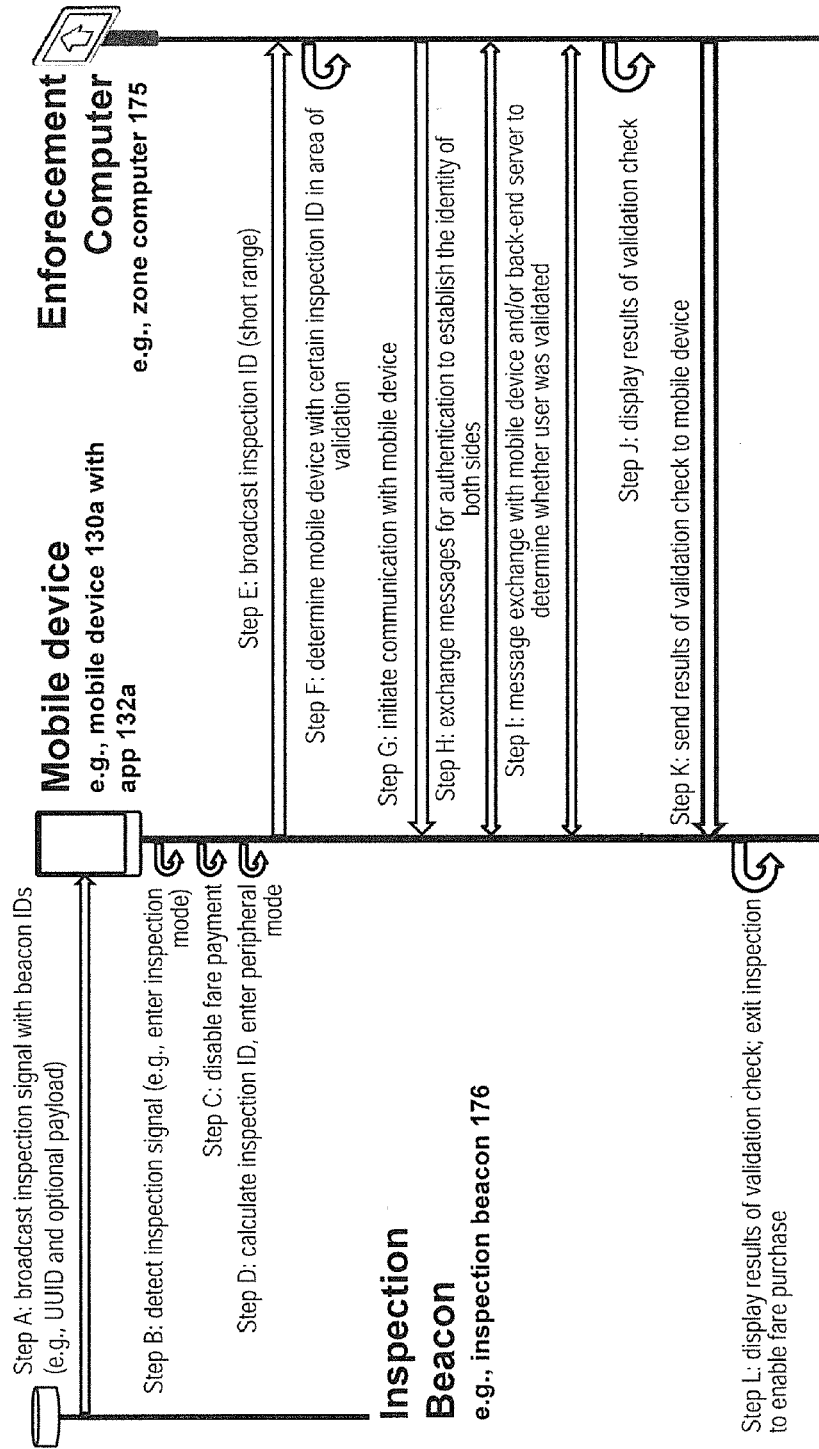
FIG. 7 shows additional details of the steps for validation checks, according to an example of the present disclosure.

FIG. 7 shows detailed steps for enforcement. The steps shown in FIG. 4 for validation are also applicable for enforcement. Referring to FIG. 4, steps are shown for detection at step 10, activation at step 11, exchange at step 12 and validation at step 13. For enforcement, at detection step 10, the mobile devices 130 determine whether they are in proximity to the enforcement computer 175 based on an inspection signal received from the inspection beacon 176 shown in FIG. 1. A unique mobile device ID is calculated for each mobile device at activation step 11 based on the inspection signal. At exchange step 12, messages are exchanged between the mobile devices 130 and the enforcement computer 175 using the mobile device ID and via short distance communication interfaces to determine whether the mobile devices have been validated, e.g., whether fares have been paid. The enforcement computer 175 may communicate with a backend server to determine whether a user is currently validated. For example, the backend server may store a list of users that have paid the fare and when they paid fare and details describing what the fare payment was for. At step 13, a determination is made as to whether the user was previously validated and an indication of whether the user was validated is displayed on the enforcement computer 175, and a message may be sent from the enforcement computer 175 to the mobile device with the indication. FIG. 7 shows details of these steps 10-13.

The steps of FIG. 7 are described with respect to FIG. 1 and show the interaction between the mobile device 130a, the inspection beacon 176, and the enforcement computer 175. At step A, the inspection beacon 176 broadcasts an inspection signal. The inspection signal for example includes a UUID, a major ID and/or a minor ID, such as described above with respect to the signals broadcasted from the beacons 140. An inspection beacon for example announces that the enforcement individual 176 (e.g., an inspection officer that checks if fares have been paid) is in the vicinity by broadcasting the inspection signal. The inspection signal is distinguished from signals broadcasted from the beacons 140 for example based on information in the UUID, major ID and/or minor ID that identifies the signal as an inspection signal to the mobile devices 130.

In one example, the enforcement computer 175 may be a mobile device that includes the inspection beacon 176. In another example, the enforcement computer 175 sends a signal to the beacons 140 to place them in inspection mode, and the beacons 140 broadcast the inspection signals.

At step B, the validation and enforcement application 132a on the mobile device 130a detects the inspection signal and disables any features for buying fare products or making fare payment at step C. This prevents the "mischievous" user from only paying the fare if they are being inspected or if they sense they will be inspected. For example, the validation and enforcement application 132a allows the user 131a to create and login to an account for fare payment which may be stored and managed by a backend system (not shown). The user may enable and disable auto payment, pay a fare on demand, link a credit card or bank account to the account, etc. The fare payment feature of the validation and enforcement application 132a is disabled so a user cannot buy fare products or pay a fare through the validation and enforcement application 132a when the inspection signal is received by the mobile device 130a and detected by the validation and enforcement application 132a. When, the inspection signal is received, the validation and enforcement application 132a operates in inspection mode and disables fare payment features and fare products buying features. The inspection signal may include a UUID or a major ID that are registered to invoke launching the validation and enforcement application 132a if it is not already running. The validation and enforcement application 132a may already be running because validation may have recently occurred. Also, the inspection signal is recognized by the validation and enforcement application 132a as an inspection signal for example based on a code in the major ID or in the minor ID.

In one example, the inspection signal broadcasted from the inspection beacon 176 is a Bluetooth or BLE signal. In another example, tap-based detection is performed and the inspection signal may be a Bluetooth or BLE signal tuned for a shorter distance, such as 3-4 centimeters. For tap-based detection, the user 131a may tap the mobile device 130a on the enforcement computer 175 carried by the enforcement person 177 to receive the inspection signal. The inspection signal in both examples includes the UUID, major ID and/or the minor ID and may include other information, such as signal strength, location information, etc.

At step D, the validation and enforcement application 132a calculates a unique inspection ID based on information derived from the inspection signal. The validation and enforcement application 132a enters peripheral mode and a message with the inspection ID is broadcasted or sent to the enforcement computer 175 at step E. The broadcast may be a short range broadcast, such as using BLE, Bluetooth, or NFC.

Similar to the unique mobile device ID derived for validation, such as described with respect to step D in FIGS. 5 and 6, the inspection ID may be calculated using the major ID, minor ID and optional payload from the inspection signal. Location information may be used to calculate the inspection ID. Location information may be derived from information in the UUID or the payload of the inspection signal if it is provided. Location information may be determined by the mobile device 130a for example from internal location sensors, such as GPS, or from triangulation determined from signals received from local beacons, such as the beacons 140a-d. Thus, the inspection ID may be unique to the mobile device 130a at its current location. Examples of ID calculation functions are described above.

At step F, the enforcement computer 175 receives the inspection ID from the mobile device 130a assuming it is within range, and determines whether the mobile device 130a is within an area of inspection of the enforcement computer 175. An example of an area of inspection may be an area within a one meter radius of the current location of the enforcement computer 175. The area of inspection may be smaller if tap-based detection was used at step B, such as 5-10 centimeter radius. The enforcement computer 175 may use the distance, signal strength and optionally the azimuth and angle of the broadcasted signal from the mobile device 130a to determine the location of the mobile device 130a and whether it is in the area of inspection.

At step G, if the mobile device 130a is determined to be in the area of inspection, the enforcement computer 175 initiates communication with the mobile device 130a using the inspection ID. For example, the enforcement computer 175 sends an acknowledgment message to the mobile device 130a that includes the inspection ID so the validation and enforcement application 132a in the mobile device 130a knows that the enforcement computer 175 is ready to proceed to checking the validation of the user 131a. In another example, the enforcement computer 175 may broadcast or transmit an acknowledgment message that is encrypted with a key to the mobile device 130a. Only the mobile device 130a can decrypt the acknowledgment message sent from the enforcement computer 175 because no other mobile device knows the key. In yet another example, the enforcement computer 175 and the mobile device 130a calculate the inspection ID independently using the same inputs and the same function. For example, the inputs for the inspection ID calculation function described above may be determined by the mobile device 130a and broadcasted or sent to the enforcement computer 175 along with the inspection ID calculated by the mobile device 130a. Both the enforcement computer 175 and the mobile device 130a store the same function for calculating the unique inspection ID. The enforcement computer 175 also calculates the inspection ID. The enforcement computer 175 determines if the received inspection device ID that is calculated matches the received inspection ID to determine whether to continue with the process, e.g., initiate communication, authentication and validation determination.

Mutual authentication is performed at step H. The mobile device 130a and the enforcement computer 175 may exchange messages for authentication to establish identities of both sides. The mutual authentication may include generation of a key or set of keys that are then used for further encryption, decryption, enciphering, deciphering, etc. A conventional key encryption algorithm may be used.

At step I, the enforcement computer 175 and the mobile device 130a exchange messages to determine whether the user 131a was validated. Validation checking may include exchanging messages with a backend server not shown and/or the mobile device 130a to get the information needed to check validation. In one example, checking validation may include a determination of whether a fare was paid. Messages exchanged for validation checking are referred to as inspection messages.

For example, the validation and enforcement application 132a on the mobile device 130a may receive a transaction summary from a back end server if a fare was paid. The enforcement computer 175 may request the transaction summary from the validation and enforcement application 132a, and receive it in response to the request. The enforcement computer 175 may determine from the details of the transaction summary whether the fare was paid for the current area or ride. For example, the transaction summary may include time of the transaction, location where transaction occurred, and type of ticket that was purchased. From the details of the transaction summary, the enforcement computer 175 determines whether the fare was paid. For example, if the fare was for a single ride ticket valid for the current day to any destination, then the enforcement computer 175 determines the user 131a was validated. In another example, the validation and enforcement application 132a sends a message that automatic payment is enabled, and the fare will be deducted from the user account when the destination is reached.

The enforcement computer 175 may get transaction information from a backend server to check validation. For example, the validation and enforcement application 132a may send an ID for the user account of the user 131a to the enforcement computer 175. Using the account ID, the enforcement computer 175 may request fare payment information or an indication of whether the user 131a paid the fare from the backend server that stores user account information.

At step J, the results of the validation check are displayed for example on the enforcement computer 175 so the enforcement person 177 can view the results and take appropriate action if needed. Appropriate action if the fare was not paid may include having the user 131a make payment, pay a penalty fee, issue a ticket indicating notice of failed validation to the user, and/or remove the user 131a from the validation and enforcement area 101. If the results indicate that the fare was paid, the enforcement computer 175 may mark the ticket as consumed and inspected if it is a single ride ticket, and send information of the marked ticket to the backend server.

At step K, the results of the validation check are sent to the mobile device 130a, and the validation and enforcement application 132a may display or notify the user 131a of the results of the validation check through another type of input/output device at step L. After the results of the validation check are received or an acknowledgement is received from the enforcement computer 175 or the backend server that a validation check has been performed, the validation and enforcement application 132a may exit the inspection mode, thus enabling the fare purchase feature of the validation and enforcement application 132a. The user 131a may pay the fare if the validation check indicates the fare was not paid.

After steps E and F are performed, encryption keys may be used for secure communication. As described above, the encryption keys may be used to encrypt messages between the mobile device 130a and the enforcement computer 175 or the inspection ID may be included in the messages and the information in the messages is only accepted if it includes the correct inspection ID. Accordingly, the inspection ID and/or encryption keys may be used for secure communication between the mobile device 130a and the enforcement computer 175. Also, the inspection ID and/or the encryption keys may be run-time, i.e., generated in real-time and are only valid for the current time and location and mobile device. This provides additional security.

Figure 8:
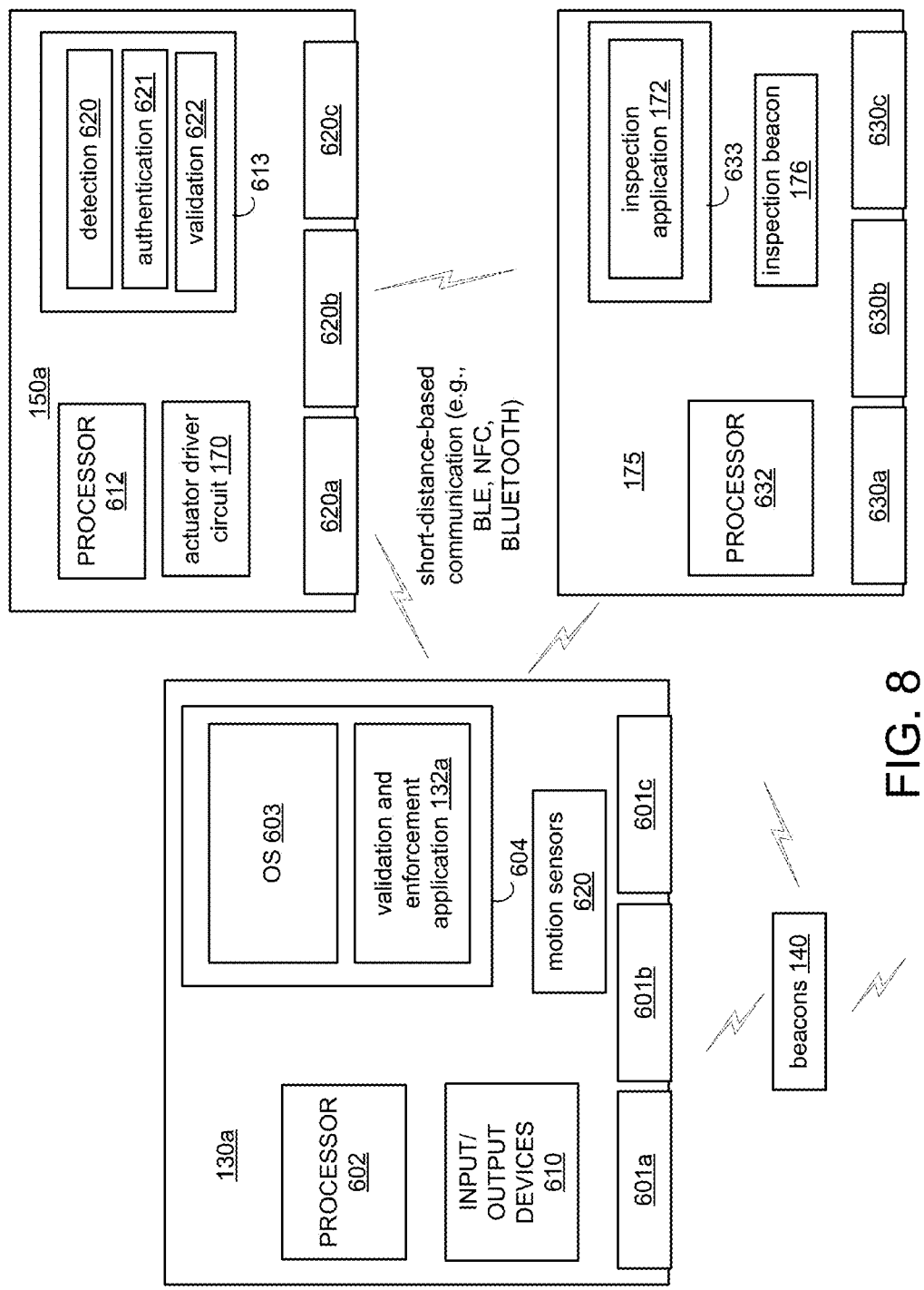
FIG. 8 illustrates a block diagram of the a secure short-distance-based communication and validation system, according to an example of the present disclosure.

FIG. 8 shows block diagrams of the mobile device 130a, the zone computer 150a, and the enforcement computer 175 of the system 100 but is representative of any of the mobile devices, zone computers and enforcement computers that may be used in the system 100. Also, some of the components of the mobile device 130a, the zone computer 150a, and the enforcement computer 175 are shown, and it will be apparent to one of ordinary skill in the art that the devices and computers may include other components not shown.

The mobile device 130a may include multiple interfaces 601, wired or wireless, for communicating with other devices. For example, interface 601a may be a Wi-Fi interface or a cellular interface or may include both interfaces. The interface 601a for example is a network interface that can communicate with a backend server via a network. 601b may include a Bluetooth interface. In one example, message exchanges between the mobile device 130a and the zone computer 150a are done through Bluetooth and the interface 601b but other interfaces may be used, such as BLE, Bluetooth 4.0 or other future versions of Bluetooth or NFC. Similarly, message exchanges between the mobile device 130a and the enforcement computer 175 are done through Bluetooth and the interface 601b but other short-distance interfaces may be used, such as Bluetooth 4.0 or other future versions of Bluetooth or NFC. Interface 601c may be a NFC interface, but the mobile device 130a may have both Bluetooth and NFC interfaces and multiple other interfaces. Interface 601b may be for communicating with the beacons 140, for example, for triangulation-based or tap-based detection.

The mobile device 130a includes a processor 602 and data storage 604. The processor 602 for example is an integrated circuit. The processor 602 may be a chipset with central processing unit and/or custom processing circuits, such as an application-specific integrated circuit (ASIC) or field-programmable gate array (FPGA). The processor 602 may run an operating system (OS) 603 and applications, including validation and enforcement application 132a, for the mobile device 130a. The OS 603 and the applications are stored in data storage 604. Any information used by the validation and enforcement application 132a and the OS 603 may be stored in the data storage 604. For example, the data storage 604 may store registered UUIDs for determining whether to launch the validation and enforcement application 132a in response to receiving a beacon signal with a registered UUID. The data storage 604 may store transaction summaries for purchased fare tickets that can be used for checking validation. Also, the data storage 604 may store keys, location information, movement information determined from motion sensors 620, etc. The data storage 604 may include memory and/or non-volatile data storage.

The mobile device 130a includes input/output (I/O) devices 610, such as keyboard, touch screen display, speaker, etc. The I/O devices 610 may provide audio, visual and/or tactile output to indicate whether a user has been validated or results of a validation check. The mobile device 130a also includes motion sensors 620. Examples of motion sensors 620 may include accelerometer, gyroscope, and/or a motion co-processor. Information from the motion sensors 620 may indicate information or measurements of the motion of the mobile device 130a. This information may be used to determine whether the mobile device 130a is in a settled state.

The zone computer 150a includes a processor 612 and a data storage 613. The processor 612 is an integrated circuit. The processor may execute software or firmware or comprise custom processing circuits, such as an application-specific integrated circuit (ASIC) or field-programmable gate array (FPGA). The data storage 613 may include memory and/or non-volatile data storage. The data storage 613 may store software or firmware including machine readable instructions and may store any information used by the zone computer 150a. The software or firmware may include subroutines or an application for detection 620, authentication 621 and validation 622, such as described with respect to FIGS. 4-6. The zone computer 150a may include I/O devices or be connected to an I/O device, such as a display, to provide indication to the user of whether they are validated.

The zone computer 150a also includes multiple interfaces 620, wired or wireless, for communicating with other devices. For example, interface 620a may be a Wi-Fi interface or a cellular interface or may include both interfaces. 620b may include a Bluetooth or Bluetooth 4.0 or BLE interface. In one example, message exchanges between the mobile device 130a and the zone computer 150a are done through a Bluetooth but other interfaces may be used. 620c may be a NFC interface, but the mobile device 130a may have both BLE and NFC interfaces. The interfaces 620b and 620c are short-distance communication interfaces. A short-distance communication interface may have a communication range of few meters (e.g., Bluetooth or BLE) or centimeters (e.g., NFC). The range is generally much shorter than Wi-Fi or cellular. The short-distance communication interface may cover a sub-location or a sub-location and its adjacent sub-location. The zone computer 150a may connect via a network interface of interfaces 620 to a server backend via the Internet or another wide area network or a local area network for validation, which may include fare payment.

If the zone computer 150a is used in a gated environment, such as shown in FIG. 3, it may include an actuator driver circuit 170 to control actuation of the physical barrier for the sub-location of the zone computer. In response to determining the user is validated, the zone computer 150a sends a signal to the actuator driver circuit 170 to invoke opening of the physical barrier, such as gate 160a for lane 110a. For example, the processor 612 validates a user associated with the mobile device 130a and sends a signal to the actuator driver circuit 170. The actuator driver circuit 170 drives an actuator of the gate 160a to open the gate 160a shown in FIG. 3. The processor 612 may also drive the circuit 170 to close the gate 160a. In one example, the global positioning system (GPS) sensor on the mobile device may be used to determine when the user enters and exits the mass transit system in order to determine the fare amount and open the gate 160a if the fare is paid when the user is exiting.

The enforcement computer 175 includes a processor 632 and a data storage 633. The enforcement computer 175 may be a mobile device or a stationary computer. The processor 632 is an integrated circuit. The processor may execute software or firmware or comprise custom processing circuits, such as an application-specific integrated circuit (ASIC) or field-programmable gate array (FPGA). The data storage 633 may include memory and/or non-volatile data storage. The data storage 633 may store software or firmware including machine readable instructions and may store any information used by the enforcement computer 175. The software or firmware may include the inspection application 172 that performs the functions described above with respect to FIG. 7.

The enforcement computer 175 also includes multiple interfaces 630, wired or wireless, for communicating with other devices. For example, interface 630a may be a Wi-Fi interface or a cellular interface or may include both interfaces. The interface 630a for example is a network interface that can communicate with a backend server via a network. 630b may include a Bluetooth interface and 630c may be a BLE or NFC interface or some other type of short-distance interface, but the enforcement computer 175 may have both BLE and NFC interfaces.

The enforcement computer 175 may include the inspection beacon 176 that broadcasts the inspection signal or the inspection beacon 176 may be a separate device from the enforcement computer 175. The beacons 140 are also shown. As stand-alone devices, the beacons 140 and/or the inspection beacon 176 may include circuits that may be programmed with a UUID and an interface for broadcasting their signals. In one example, the inspection beacon 176 and the beacons 140 may broadcast their signals using Bluetooth. If the beacons 140 and/or the inspection beacon 176 are incorporated in the zone computer 150a or the enforcement computer 175, they may use the interface of the computer for their broadcasts. Also, exchange of messages between the mobile device 130a, the zone computer 150a and the enforcement computer 175 may be through Bluetooth.

Figure 9:
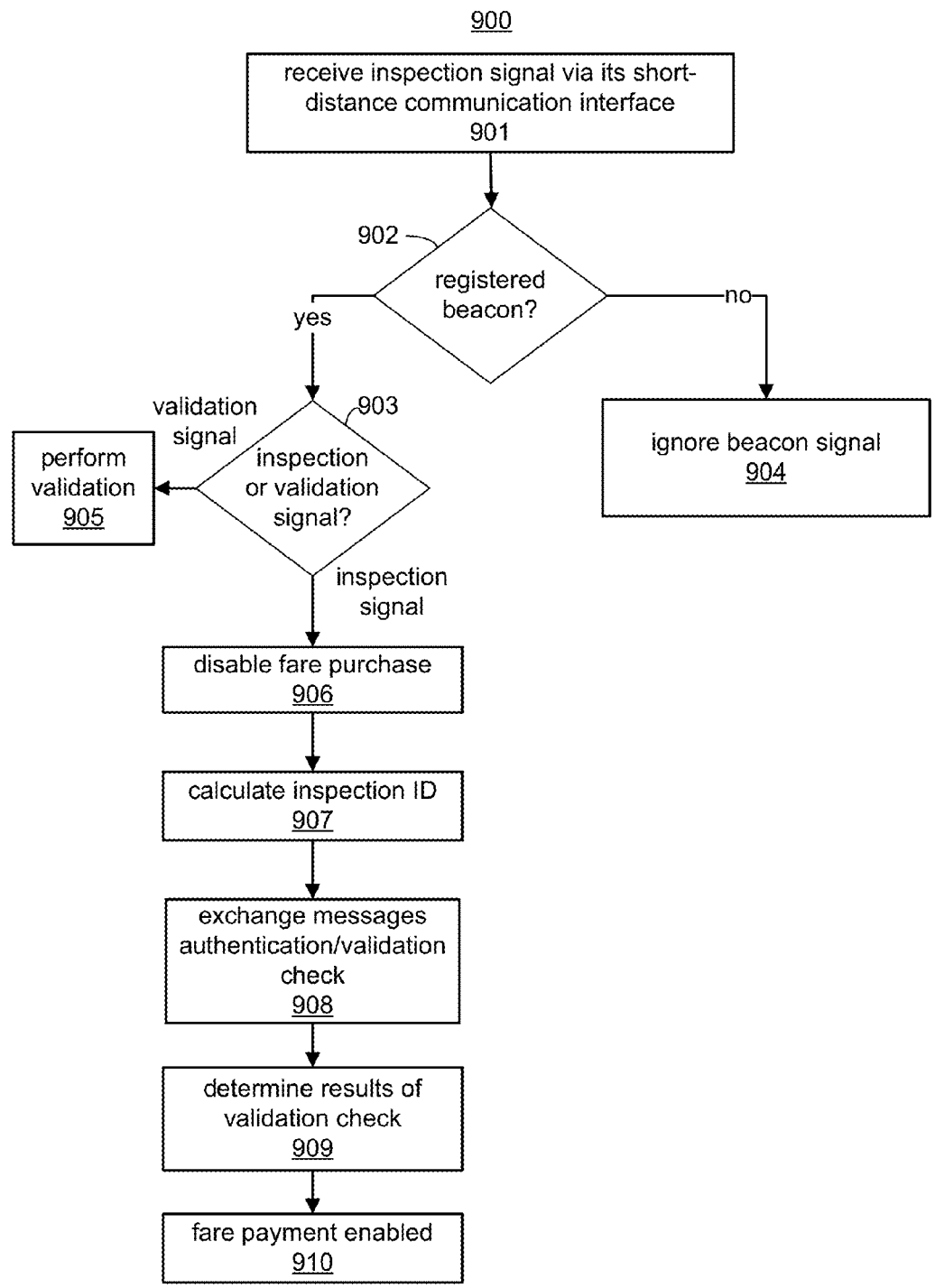
FIGS. 9 and 10 illustrate flowcharts of methods performed for validation and enforcement, according to examples of the present disclosure.

FIG. 9 shows a flowchart of a method 900 that may be performed by a mobile device, such as the mobile device 130a in the system 100, for checking validation. The method 900 is described by way of example with respect to the system 100 shown in FIG. 1 but may be performed in other systems. At 901, the mobile device 130a receives a signal from a beacon via its short-distance communication interface, such as via BLE or NFC. For example, the inspection beacon 176 broadcasts an inspection signal and it is received by the mobile device 130a.

At 902, the mobile device 130a determines whether the received beacon signal is from a registered beacon. For example, the OS 603 running on the mobile device 130a determines whether the UUID or major ID in the received beacon signal is from a registered UUID or major ID. If the received beacon signal is from a registered beacon, the information for the beacon signal is sent to the validation and enforcement application 132a. If the validation and enforcement application 132a is not running, the OS 603 launches the validation and enforcement application 132a and sends the inspection signal information to the validation and enforcement application 132a. The mobile device 130a stores the registered beacon IDs (e.g., the major IDs) for the beacons 140 and the inspection beacon 176 so the OS 603 recognizes their beacon signals. At 904, if the beacon signal is not recognized it is ignored.

At 903, the validation and enforcement application 132a determines whether the received beacon signal is a validation signal or an inspection signal. A code in the beacon signal may identify it as a validation signal or an inspection signal. The validation signal is a beacon signal sent by one or more of the beacons 140, and may be used to invoke validation, such as described in FIGS. 4-6. If the beacon signal is a validation signal, at 905, validation is performed such as described with respect to FIGS. 4-6. For example, a unique mobile device ID is calculated based on information in the beacon signal and is used to deduct the fare.

If the beacon signal is an inspection signal, such as from the inspection beacon 176, then a validation check is performed, such as described with respect to FIG. 7. For example, at 906, fare purchase is disabled. For example, the validation and enforcement application 132a may include a fare payment feature that allows the user 131a to pay a fare by logging into their account. This feature is disabled. Also, the buying of fare products is disabled so the user cannot enable payment through another means during inspection.

At 907, an inspection ID is calculated based on information received from the inspection signal. The inspection ID may be unique to the mobile device 130a and the current location of the mobile device 130a when the inspection ID is calculated. At 908, messages are exchanged with the enforcement computer 175 using the inspection ID and one or more encryption keys via a short-distance communication interface (e.g., Bluetooth) to authenticate the mobile device 130a and to determine whether the user 131a was validated. As discussed with respect to FIG. 7, this may include determining whether the user 131a paid the fare. Results of the validation check are determined at 909. The enforcement computer 175 may determine the results of the validation check and display them on the enforcement computer 175 and send the results to the mobile device 130a.

At 910, after the validation results are received by the validation and enforcement application 132a, the fare payment is enabled. If the user 131a was determined to not have paid the fare, the user 131a may now pay the fare through the validation and enforcement application 132a.

Figure 10:
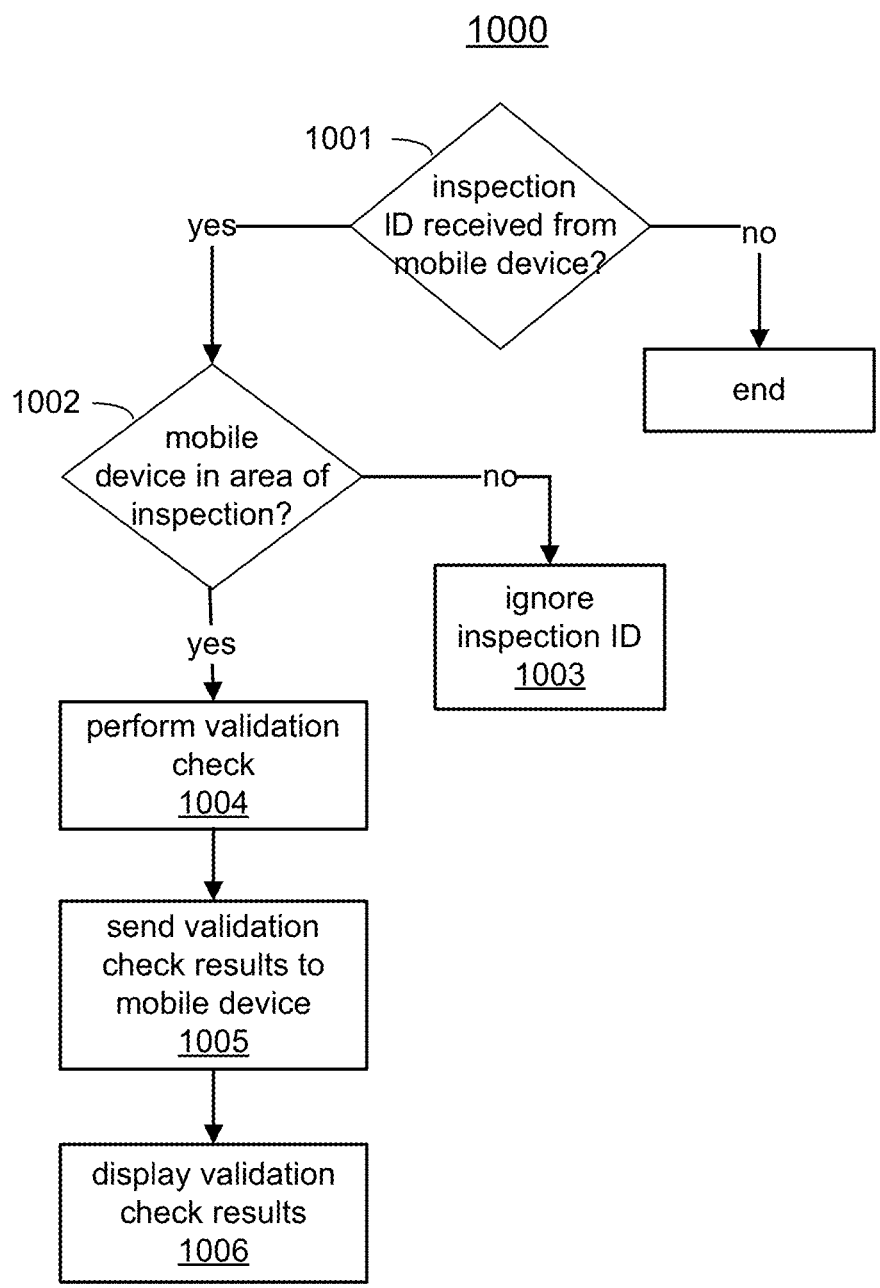

FIG. 10 shows a flowchart of a method 1000 that may be performed by an enforcement computer, such as the enforcement computer 175, in the system 100. At 1001, the enforcement computer 175 determines whether an inspection ID is received from the mobile device 130a via a short-distance communication interface of the enforcement computer 175. If the inspection ID is received, the enforcement computer 175 determines whether the mobile device 130a is in an area of inspection for the enforcement computer 175 at 1002. If tap-based detection was used, the enforcement computer 175 can determine whether the user tapped or came within close proximity (e.g., within 4-5 cm) of the enforcement computer 175. Alternatively, the enforcement computer 175 may scan for all Bluetooth mobile devices in range looking for devices which expose certain services/characteristics, and determines a mobile device is in the area of inspection based on signal strength, dwell angle, etc.

At 1003, if the mobile device 130a is not in the area of inspection, the inspection ID is ignored. If the mobile device 130a is in the area of inspection, the enforcement computer 175 determines whether the user 131a associated with the mobile device 130a was validated at 1004. At 1004, the validation is checked for example to determine whether the user 131a paid the fare.

At 1005, the enforcement computer 175 sends a message to the mobile device 130a with the validation check results. that the user is validated if the user is determined to be validated. Otherwise, at 1006, a message is sent indicating validation failure. Validation results may also be displayed on display.

As discussed above and shown in FIG. 1, the enforcement computer 175 may be a mobile device that may be carried by an inspector or some other individual, e.g., enforcement person 177, to validate people in the validation and enforcement area 101. For example, the enforcement computer 175 is in close proximity to the mobile device 130a as shown in FIG. 1 and communicates with the mobile device 130a to check the validation of the user 131a. The enforcement computer 175 for example runs an inspection application 172 to check the validation of the users 131. The inspection beacon 176 can transmit an inspection signal to facilitate the checking of the validation of the users 131. For example, when the enforcement person 177 wants to request proof of payment of the users 131, the enforcement person 177 triggers the broadcasting of an inspection signal from the inspection beacon 176 via Bluetooth or via some other short-distance wireless communication interface, and the mobile device of each user receiving the inspection signal may generate a visual indication based on the inspection signal of whether the user paid the fare or is otherwise authorized to be in the validation and enforcement area 101. The visual indication is displayed on the mobile device and may be shown to the enforcement person 177. As discussed in further detail below with respect to FIG. 11, the visual indication may be customized by the enforcement person 177 or another individual.

Figure 11:
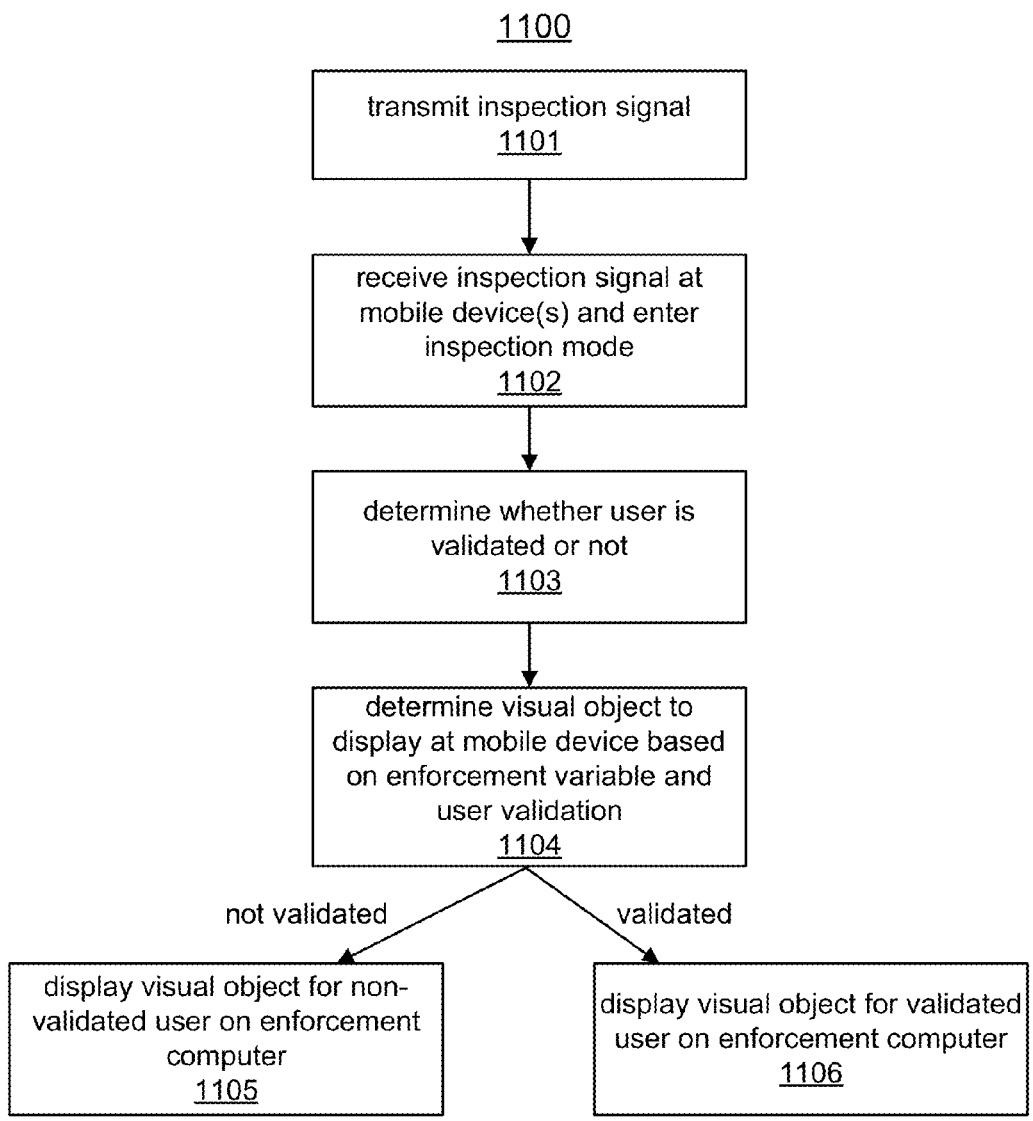
FIG. 11 illustrates a method for enforcement, according to an example of the present disclosure.

FIG. 11 illustrates a method for enforcement based on generation of a visual object. The method of FIG. 11 is described by way of example with respect to the system shown in FIG. 1 but the method may be used in other systems. Referring to FIG. 1, steps of the method may be performed by the enforcement computer 175 and the mobile devices 130. For example, one or more steps may be performed by the inspection application 172 running on the enforcement computer and the validation and enforcement applications 132 running on the mobile devices 130.

As indicated above, the method of FIG. 11 shows a method 1100 for enforcement based on generation of a visual object. A visual object is information that can be displayed on an electronic display. In an example, the electronic display may be a display of any of the mobile devices 130, the enforcement computer 175 and/or another display. Examples of a visual object include an image, animation, video, text, symbol, shape, picture, bar code, etc.

At 1101, an inspection signal is transmitted by at least one inspection beacon, such as the inspection beacon 176. The inspection signal includes an enforcement variable for determining a visual object to display, for example on the mobile devices 130, to validate that the users 131 paid the fare or are otherwise authorized to be in the validation and enforcement area 101. The enforcement variable may be an integer, a string or some other variable type. The inspection beacon 176 may be part of the enforcement computer 175 or may be provided as a separate device or may be incorporated in another computer other than the enforcement computer 175.

The enforcement person 177 may selectively trigger the transmission of the inspection signal from the inspection beacon 176 at step 1101. For example, the inspection application 172 running on the enforcement computer 175 receives user input from the enforcement person 177 via an input/output device of the enforcement computer 175 to start transmitting the inspection signal, such as when the enforcement person 177 wants to verify that a user or set of users in proximity to the inspection beacon 176 are validated. In another example, the transmission of the inspection signal may be triggered by movement, such as when the vehicle moves or when the enforcement computer 175 moves. For example, the enforcement computer 175 may be a mobile device that includes a sensor that detects movement of the enforcement computer 175. An amount of movement or rate of speed of movement of the enforcement computer 175 may be measured to trigger the broadcast of the inspection signal. According to an example, movement of the enforcement computer 175 at a high rate of speed, such as an intentional shaking of the mobile enforcement computer 175 may trigger transmission of the inspection signal. For example, instead of pressing a button on a display of the enforcement computer 175 which is generated by the inspection application 172, the enforcement person 177 shakes the mobile enforcement computer 175 to trigger transmission of the inspection signal. In another example, the inspection signal is broadcasted periodically (e.g., time-based) or at different locations (e.g., location-based), such at each but stop or train stop.

The visual object that indicates whether a user is validated may be changed periodically to prevent fraud. For example, if the same visual object is always used to indicate that a user is validated, the visual object may be copied and displayed on the mobile device of a user to represent that the user has paid even when the user did not. The enforcement variable, which is included in the inspection signal transmitted from the inspection beacon 176, may be changed to invoke generation of different visual objects to indicate whether a user is validated or not. A different enforcement variable may be used for a different visual object, or a different enforcement variable may be used for a different set of visual objects if multiple visual objects are used, such as a different visual object for each fare category as discussed below. The enforcement variable may be changed to invoke generation of a different visual object created or selected by a user, such as the enforcement person 177 via the enforcement computer 175. Also, different visual objects may be selected or created for different categories of users or fares (e.g., adult, child, senior, peak hours, non-peak hours, daily pass, weekly pass, etc.) and for different indications, such as to indicate paid or not paid.

A determination of when to change the visual object may be based on received user input, and/or may be based on conditions that are detected or measured to automatically trigger changing of the visual object. The received user input to change the visual object may be provided from the enforcement person 177 via the enforcement computer 175. For example, the inspection application 172 running on the enforcement computer 175 may generate a display that allows a user to provide input to change the visual object. The user may select visual objects to display to indicate a validated user, a non-validated user, different categories of users, etc. A different enforcement variable may be used for each set of visual objects. Instead of or in addition to the enforcement person 177 selecting the visual objects for display, the visual objects can also be selected by another person, such as another transit agency employee. This person may be tasked with curating the visual objects. The visual objects may be selected periodically for routes, stops, durations, times, user profiles, fare types, etc.

By way of example, the conditions to trigger changing of the visual objects automatically may be based on time, location, movement or other factors. For example, a different visual object or a set of different visual objects may be used for different days, hours, or other time periods. Different visual objects may be used for different vehicles, or different vehicle stops or different vehicle routes. In another example, movement of the enforcement person 177 and/or the mobile enforcement computer 175 may be measured to trigger changing the visual objects. For example, after a predetermined number of steps are taken by the enforcement person 177, the visual objects are changed. In another example, changing of the visual objects may be randomized.

At 1102, the mobile devices 130 within range of the inspection signal receive the inspection signal and enter inspection mode whereby fare buying via the validation and enforcement applications 132 is disabled.

At 1103, the mobile devices 130 that received the inspection signal and that are in inspection mode each determines whether the user associated with the mobile device is validated for the validation and enforcement area 101. For example, to determine whether the user is validated, the mobile device accesses validation or fare payment information that is stored locally in the mobile device or may request the information from a remote server or any type of remote computer. In an example, the mobile device may store a recent transaction summary for fare payment, and the transaction summary is parsed to determine whether it is valid for the current location and the current time.

At 1104, each of the mobile devices 130 that received the inspection signal determines a visual object to display based at least on the enforcement variable in the inspection signal and the validation determination from 1103. For example, the mobile device stores a function for calculating the visual object to display from the enforcement variable in the inspection signal. In a simple example, the function may be modulo (enforcement variable*validation determination), whereby the enforcement variable is an integer greater than or equal to 1 and the validation determination is 0 or 1 depending on whether the user is validated. If the validation determination is 0 (e.g., meaning the user is not validated), the function returns "undefined" or an error, and a visual object indicating that the user is not validated is displayed on a display of the mobile device at 1105. If the validation determination is 1 (e.g., meaning that the user is validated), a visual object indicating that the user is validated is displayed on the mobile device at 1106. In another example, a function for determining the visual object based on a category associated with a user may include (enforcement variable*validation determination*category). The category may be a numeric value representing a particular category. For example, 1 is assigned to an adult, non-peak fare; 2 is assigned to adult, peak fare, etc. Accordingly, the output of the function may be used to identify a visual object representing the category of the user and whether the user is validated or not. Of course, other functions may be used, and the output of the function may be a value for determining the visual object.

To determine the visual object to display at the mobile devices 130 of the users 131 based on the output of the function, different mechanisms may be used. In an example, a mobile device stores a library of visual objects and an associated function output value for each visual object. For example, if the output of the function is "undefined" (e.g., meaning the user is not validated), a lookup in the library is performed to retrieve the visual object for "undefined", and the mobile device 130 displays the visual object.

The library of visual objects may include a visual object for each category of user or fare and for an indication of validated or not validated. For example, if the user is under a child fare, the visual object may be a child with a green background if the user is validated, and if the user is under an adult fare, the visual object may be a businessman with a green background if the user is validated. A non-validated user of any category may be a flashing red star. A lookup in the library is performed based on the output of the function (i.e., function output value) to determine and retrieve the visual object from the library to display that represents the category of the user and whether the user is validated or not.

As discussed above with respect to step 1101, the visual objects may be changed periodically, such as to prevent fraud. The enforcement variable is included in the inspection signal, and a different enforcement variable may be included depending on the visual objects that are to represent whether a user is validated or not, category of user, etc. Table 1 below shows how an enforcement variable is related to a visual object and a function output, and how changing a visual object based on the enforcement variable may be performed.

TABLE 1

| Enforcement Variable | Visual Object | Indication Represented by Visual Object | Function Output Value (lookup value) |
|---|---|---|---|
| 256 | Green Square | Validated User | 3010 |
| 256 | Red Square | Non-Validated User | undefined |
| 277 | Blue Sky | Validated User | 2012 |
| ... | ... | ... | ... |

Table 1 includes columns for enforcement variable, visual object, indication represented by visual object, and function output value. According to an example, assume that initially the enforcement person 177 selects through the inspection application 172 that a green square is to represent a validated user and a red square is represented by a non-validated user. For these selections, enforcement variable value 256 is transmitted in the inspection signal. A mobile device of the mobile devices 130 receives the inspection signal and calculates a function output value according to the enforcement variable, a determination of whether the user is validated or not, and possibly other information, such as category. The library of visual objects stored in the mobile device may include the columns for visual object and associated function output values, which are the lookup values for the library of visual objects. The mobile device calculates the function output value and performs a lookup with the function output value (e.g., 3010) in the library of visual objects to determine the visual object to display (e.g., green square). A green square is displayed if the user is validated. Subsequently, the enforcement person 177 selects a blue sky image to represent a validated user. The enforcement variable value 257 is transmitted in the inspection signal. A mobile device receiving the inspection signal calculates a function output value (e.g., 2012) according to the enforcement variable, and a determination of whether the user is validated or not. The mobile device performs a lookup with the function output value (e.g., 2012) to determine the visual object to display is the blue sky for the validated user.

Multiple images that represent different categories of users and whether a user is validated or not may be associated with an enforcement variable and stored in the library of visual objects. Accordingly, different sets of images may be associated with different enforcement variables. Also, the library of visual objects may be periodically updated, for example, by downloading new libraries or updates to the library from a remote server.

Instead of using a locally stored library of visual objects, in another example, the mobile device sends the function output value to a remote server, and the remote server sends to the mobile device an image associated with the function output value to display.

In another example, the mobile device calculates a unique identifier based on information in the beacon, e.g., the unique identifier may be the function output value. The mobile device sends the unique identifier along with a user credential for the user of the mobile device to the server. The server validates the fare payment information according to the received information and sends back the correct visual object based on profile, location, etc., to the mobile device for display.

In yet another example, an image is stored in the mobile device, and based on the function output value, the mobile device modifies the image and displays the modified image. For example, the stored image may have a blue background. If the output of the function is "undefined" (e.g., meaning the user is not validated), the background color is changed to red. If the output of the function is a different value (e.g., meaning the user is validated), the background color is changed to green. In another example, if the image includes a shape, the shape is changed according to the function output value, or if the image includes text, the text may be changed according to the function output value. The mobile device may include programming or accessing a library that indicates the change to effect on the stored image based on the function output value.

In another example, the function output value may be a bite array that is converted to an image by the validation and enforcement application. For example, the bite array may be pixel locations and dots of a predetermined color and intensity are displayed at each location. In other examples, the bite array may specify vertices of a triangle or a square or another shape, or the bite array may include ASCII values that are converted to text or a string that can be displayed.

The visual object displayed based on the function output value may be selected and/or created by the enforcement person 177 or another individual. For example, the enforcement person 177 may select images that are associated with a validated user, a non-validated user, and different categories of users or fares. The selections may be stored in a remote server and downloaded to the mobile devices 130. For example, the mappings of function output values to images may be downloaded to the mobile devices 130 and used to determine the visual object to display based on the calculated function output value. Also, the enforcement person 177 may create visual objects and upload the created visual objects to be displayed.

The enforcement computer 175 stores the same function as the mobile device, e.g., modulo (enforcement variable*validation determination). The enforcement computer 175 also stores the current enforcement variable that is transmitted in the inspection signal. At 1105, the enforcement computer 175 also calculates the output of the function assuming the user is validated (e.g., the validation determination is 1) and displays the visual object associated with the current enforcement variable and representative of a validated user. If there are multiple categories of validated users and different visual objects associated with each category, then the enforcement computer 175 may display each of the visual objects representing the multiple categories of validated users and a description of the respective category for each visual object. Then, the enforcement person 177 can ask each user that is within a predetermined proximity to the enforcement computer 175, which includes the inspection beacon 176 transmitting the inspection signal, to show their mobile device that should be displaying a visual object. If the mobile device is displaying the same visual object as the enforcement computer 175, the enforcement individual can quickly determine the user is validated; otherwise the user may not be validated. The enforcement computer 175 may also display a visual object currently representing a non-validated user to compare against the visual object shown on the mobile device. In another embodiment, the mobile devices 130 may calculate an identifier according to information in the beacon and send the unique identifier to a remote computer server at 110.

Figure 12:
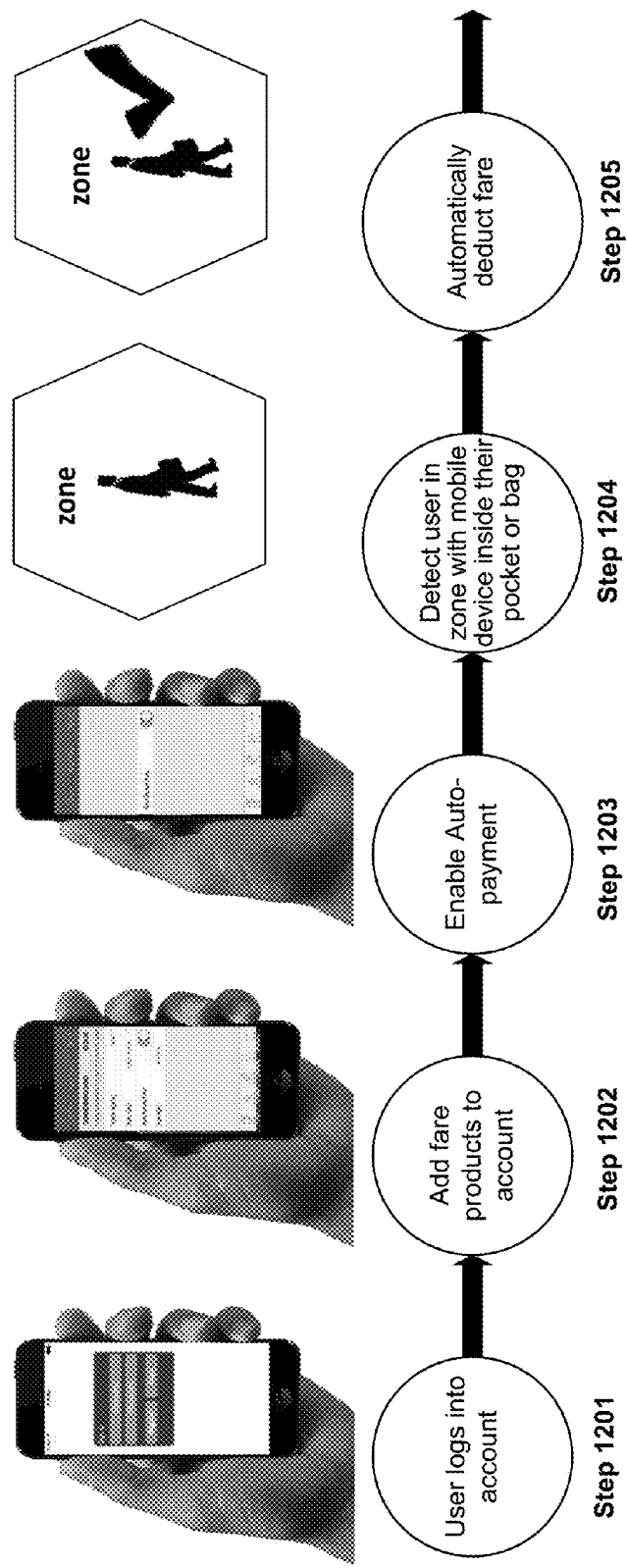
FIG. 12 illustrates a method for fare-based validation, according to an example of the present disclosure.

FIG. 12 illustrates a method 1200 to enable auto-payment via the validation and enforcement application 132a and automatically deduct the fare for validation. The validation and enforcement area 101 for example provides a fare-based service, such as a subway or train station that charges a fare to passengers that ride the train. Also, the validation and enforcement application 132a includes modules to enable fare payment. FIG. 12 shows enabling auto-payment, however, the validation and enforcement application 132a may also allow the user to pay the fare on demand in response to user input. For example, if the user enters the validation and enforcement area 101, the validation and enforcement application 132a may detect that the mobile device 130a is in the validation and enforcement application 132a and displays a screen that allows the user to select payment of the fare.

At 1201, the user 131a logs into their account. The user 131a may have to create an account if they don't have one. The validation and enforcement application 132a provides a graphical user interface on the mobile device 130a to receive a login ID and password and send the information to a backend server to login the user 131a into their account. At 1202, the validation and enforcement application 132a adds fare products to the account based on user selections. Fare products includes any goods or services for which the user is authorizing payment. At 1203, the validation and enforcement application 132a enables auto-payment of the selected fare products in response to user input. At 1204, the mobile device 130a is detected in the validation and enforcement area 101, such as a zone or a fare-gate lane. The mobile device 130a may remain in the user's pocket or bag to pay the fare, which is more convenient for the user. At 1205, the user's account is automatically deducted. The amount deducted is based on the fare scheme used by the transit entity, which may be based on distance, day pass, etc. In one example, a single fare is charged regardless of distance traveled. In another example, distance traveled or number of stops is determined to calculate the fare and the fare is deducted. To determine the distance traveled or number of stops traveled (e.g., when the user is a passenger on the train) the validation and enforcement application on the mobile device determines when the user leaves the train or leaves a train station. For example, the mobile device of the user may receive a signal via the short-distance communication interface of the mobile device from a beacon at an exit to the train station or near the exit of the vehicle that indicates the user has left the train or train station. The signal may identify the train station, so the validation and enforcement application can determine the train station where the user got on the train and the train station where the user got off the train in order to calculate the fare.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An enforcement computer deployable in a short-distance-based communication and enforcement system, the enforcement computer comprising:
a short-distance communication interface;
a display device; and
a processor to:
determine a first set of visual objects, the first set of visual objects including a visual object representing a validated user and another visual object representing a non-validated user in a validation and enforcement area;
assign a first enforcement variable value to the first set of visual objects, the first enforcement variable value identifying both the visual object representing the validated user and the other visual object representing the non-validated user;
display, on the display device, the visual object representing a validated user for a current time period based on the first enforcement variable value; and
broadcast an inspection signal including the first enforcement variable value via the short-distance communication interface,
wherein in response to a mobile device receiving the inspection signal, the mobile device is to:
determine a visual object to display based on the first enforcement variable value and a determination of whether a user associated with the mobile device is validated for the validation and enforcement area; and
display the determined visual object on a display of the mobile device,
wherein the visual object displayed on the display of the enforcement computer and representing a valid user for the current time period is the same as the visual object displayed on the mobile device if the user associated with the mobile device is determined to be validated for the validation and enforcement area.

2. The enforcement computer of claim 1, further comprising an input/output device, wherein at least one visual object of the first set of visual objects is replaced or modified based on input received via the input/output device, and the processor is to:
assign a second enforcement variable value to a second set of visual objects, the second set of visual objects including the at least one replaced or modified visual object;
broadcast an inspection signal including the second enforcement variable value; and
display, on the display device, a visual object from the second set of visual objects, the visual object from the second set of visual objects representing a valid user for a current time period associated with the broadcasting of the inspection signal including the second enforcement variable value,
wherein a mobile device within a vicinity of the broadcast inspection signal is to:
receive the inspection signal including the second enforcement variable value;
determine a visual object based on the second enforcement variable value and a determination of whether a user associated with the mobile device within the vicinity is validated for the validation and enforcement area; and
display the determined visual object on a display of the mobile device,
wherein the visual object from the second set of visual objects that is displayed on the display of the enforcement computer is the same as the visual object displayed on the mobile device within the vicinity if the user associated with the mobile device within the vicinity is determined to be validated for the validation and enforcement area.

3. The enforcement computer of claim 2, wherein the input to replace or modify the at least one visual object comprises a selection of a new visual object or an indication of a modification to the at least one visual object.

4. The enforcement computer of claim 1, wherein the processor is to replace or modify at least one of the first set of visual objects in response to at least one trigger condition associated with time, location, and measured movement of the enforcement computer.

5. The enforcement computer of claim 1, wherein the processor is to trigger broadcasting of the inspection signal in response to detecting a predetermined movement of the enforcement computer or detecting a predetermined location of the enforcement computer.

6. The enforcement computer of claim 1, wherein the first set of visual objects include visual objects representing different categories of validated users in the validation and enforcement area.

7. The enforcement computer of claim 1, wherein a mobile device within a vicinity of the inspection signal is to:
   calculate a function output value based at least upon the first enforcement variable value and a determination of whether a user associated with the mobile device is validated for the validation and enforcement area or is not validated for the validation and enforcement area; and
   determine the visual object to display on the display of the mobile device from the function output value.

8. A mobile device comprising:
   at least one short-distance communication interface to receive, from an enforcement computer in a validation and enforcement area, an inspection signal, the inspection signal including an enforcement variable value for an enforcement variable, wherein the enforcement variable value identifies a set of visual objects, the set of visual objects including a visual object representing a validated user and another visual object representing a non-validated user associated with the mobile device in the validation and enforcement area;
   a display;
   a data storage storing a validation and enforcement application; and
   a processor executing the validation and enforcement application to:
      extract the enforcement variable from the inspection signal;
      determine whether a user associated with the mobile device is validated for the validation and enforcement area;
      determine a visual object from the set of visual objects to display on the display based on the enforcement variable value and the determination of whether the user associated with the mobile device is validated for the validation and enforcement area; and
      display the determined visual object on the display of the mobile device,
      wherein a visual object representing a validated user is displayed on a display of the enforcement computer, and the visual object displayed on the display of the enforcement computer is the same as the visual object displayed on the mobile device if the user associated with the mobile device is determined to be validated for the validation and enforcement area.

9. The mobile device of claim 8, wherein the at least one short-distance communication interface is to receive a second inspection signal including a second enforcement variable value from the enforcement computer; and
   the processor executing the validation and enforcement application is to:
      extract the second enforcement variable value from the inspection signal;
      determine a visual object to display based on the second enforcement variable value and a determination of whether the user associated with the mobile device is validated for the validation and enforcement area; and
      display the determined visual object on the display of the mobile device.

10. The mobile device of claim 9, wherein the processor is to:
   calculate a function output value based at least upon the enforcement variable value and the determination of whether the user associated with the mobile device is validated for the validation and enforcement area or is not validated for the validation and enforcement area; and
   determine the visual object to display on the display of the mobile device from the function output value.

11. The mobile device of claim 10, wherein the data storage is to store a library of visual objects and the processor is to perform a lookup with the function output value on the library to determine the visual object to display.

12. The mobile device of claim 11, wherein the library of visual objects is updated with new visual objects.

13. The mobile device of claim 8, wherein the processor is to determine the visual object to display based on a modification to a stored visual object determined according to the enforcement variable value.

14. The mobile device of claim 8, wherein the processor is to determine the visual object to display based on a bit array determined according to the enforcement variable value, wherein the bit array represents points of the visual object.

15. A method for validation enforcement comprising:
   determining at an enforcement computer a first set of visual objects, the first set of visual objects including a visual object representing a validated user and another visual object representing a non-validated user in a validation and enforcement area;
   assigning, by the enforcement computer, an enforcement variable value to the first set of visual objects, the enforcement variable value identifying both the visual object representing the validated user and the other visual object representing the non-validated user;
   displaying, on a display of the enforcement computer, the visual object representing a validated user for a current time period based on the enforcement variable value;
   transmitting an inspection signal from an inspection beacon of the enforcement computer, wherein the inspection signal includes the enforcement variable value;
   receiving, by a mobile device within a vicinity of the inspection signal, the inspection signal including the enforcement variable value;
   determining, by the mobile device, a visual object to display based on the enforcement variable value and a determination of whether a user associated with the mobile device within the vicinity is validated for the validation and enforcement area; and
   displaying the determined visual object on a display of the mobile device, wherein the visual object displayed on the display of the enforcement computer is the same as the visual object displayed on the mobile device if the user associated with the mobile device is determined to be validated for the validation and enforcement area.

16. The method of claim 15, comprising:
   changing, based on user input received at the enforcement computer, the visual object representing a validated user in the validation and enforcement area;

determining, by the enforcement computer, a second enforcement variable value based on the changed visual object; and transmitting, from the enforcement computer, a second inspection signal including the second enforcement variable value.

17. The method of claim 16, comprising:

replacing or modifying at least one of the visual objects in response to at least one trigger condition associated with time, location, and measured movement of the enforcement computer.

* * * * *